United States Patent
Akahori et al.

(10) Patent No.: US 6,710,802 B2
(45) Date of Patent: *Mar. 23, 2004

(54) IMAGE RECORDING APPARATUS AND IMAGE REPRODUCING APPARATUS

(75) Inventors: Hiroshi Akahori, Hirakata (JP); Hiroyoshi Komobuchi, Kyoto (JP); Akira Fukumoto, Hirakata (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/622,811

(22) Filed: Mar. 27, 1996

(65) Prior Publication Data

US 2001/0040628 A1 Nov. 15, 2001

(30) Foreign Application Priority Data

Mar. 28, 1995 (JP) ............................... 7-069824

(51) Int. Cl.$^7$ ..................... H04N 5/238; H04N 5/235
(52) U.S. Cl. ................. 348/229.1; 348/221.1; 386/117
(58) Field of Search ................ 386/4, 38, 46, 386/52, 53, 64, 95, 117; 358/906, 909.1; 360/13, 231; 348/229.1, 220.1, 221.1, 312

(56) References Cited

U.S. PATENT DOCUMENTS

| 5,144,442 A | * | 9/1992 | Ginosar et al. ............. 348/222 |
| 5,162,914 A | * | 11/1992 | Takahashi et al. ...... 358/213.19 |
| 5,264,944 A | * | 11/1993 | Takemura .................... 386/38 |
| 5,543,837 A | | 8/1996 | Aoki et al. |
| 5,648,817 A | | 7/1997 | Aoki et al. |
| 5,796,428 A | * | 8/1998 | Matsumoto et al. ........ 348/231 |
| 6,002,836 A | * | 12/1999 | Inoue et al. ................... 386/95 |
| 6,122,008 A | * | 9/2000 | Komobuchi et al. ........ 348/312 |

FOREIGN PATENT DOCUMENTS

| EP | 0 525 335 | 2/1993 |
| JP | 4-270573 | 9/1992 |
| JP | 5-22670 | 1/1993 |
| JP | 5-64075 | 3/1993 |
| JP | 6-6746 | 1/1994 |
| JP | 6-225204 | 8/1994 |
| JP | 8-242408 | 9/1996 |

OTHER PUBLICATIONS

Japanese Office Action dated Nov. 13, 2001.
European Search Report corresponding to 96104893.1 dated Dec. 10, 1997.

* cited by examiner

*Primary Examiner*—Thai Tran
*Assistant Examiner*—Christopher Onuaku
(74) *Attorney, Agent, or Firm*—RatnerPrestia

(57) ABSTRACT

In this image recording apparatus, imaging sensor obtains two video signals of different signal charge accumulation periods, in a given signal charge accumulation period which is represented by a field or a frame of a video signal, and the two video signals are recorded on a record medium, whereby a video signal of an object having a wide luminance distribution can be recorded, and as for the image reproducing apparatus, a correcting circuit corrects standard-illuminance video information and high-illuminance video information which are reproduced by a reproducing circuit, the user designates an object illuminance range to be output, through an object illuminance range designating circuit, and a level converter converts the luminance into a luminance level which can be output by a display apparatus or a printer, thereby allowing portions which are largely different in object illuminance, to be selectively displayed or output in reproduction.

29 Claims, 27 Drawing Sheets

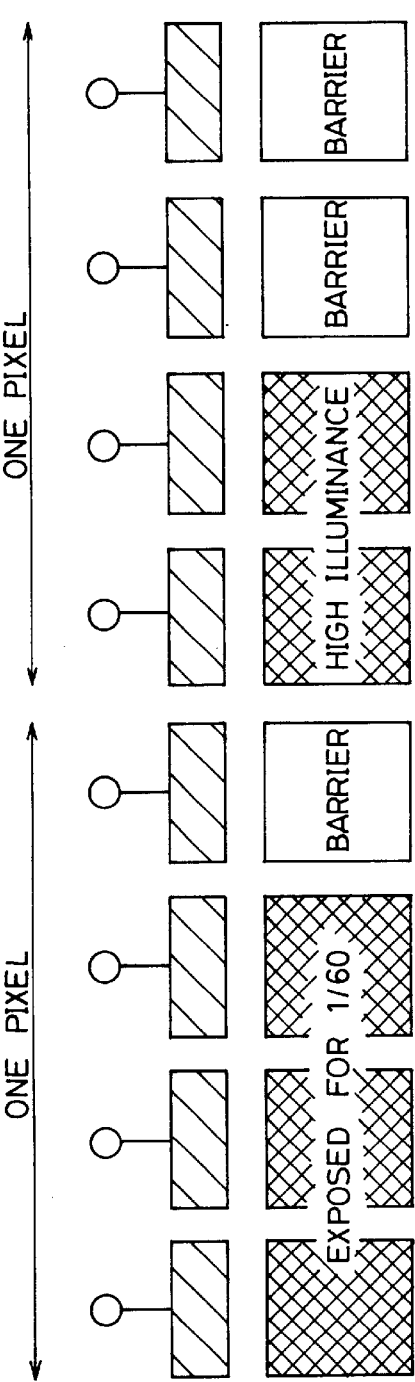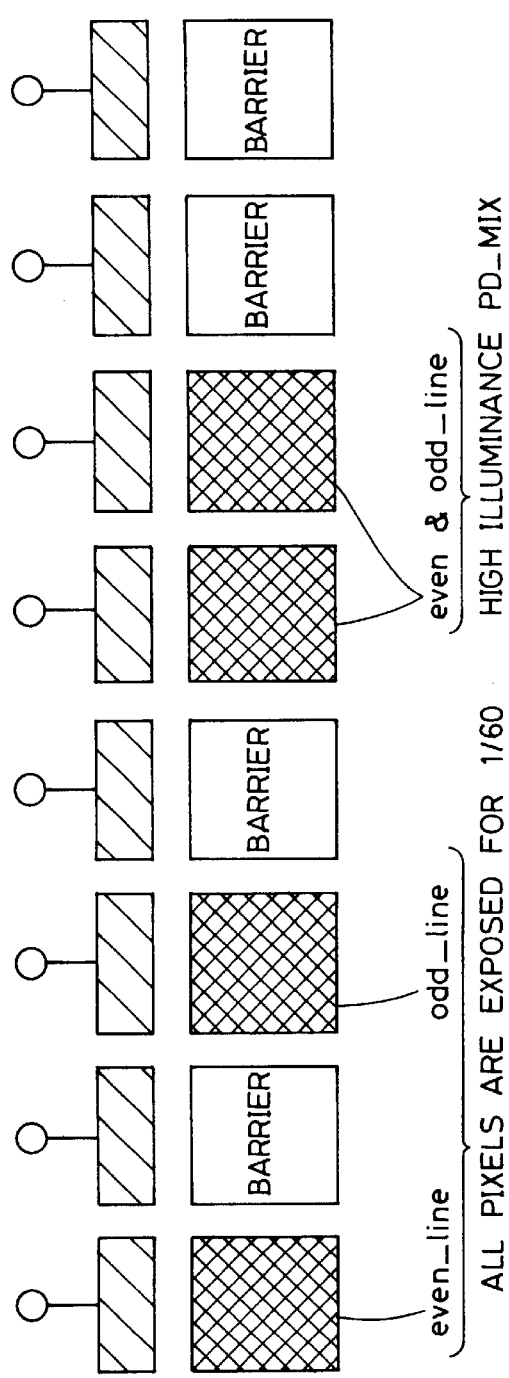

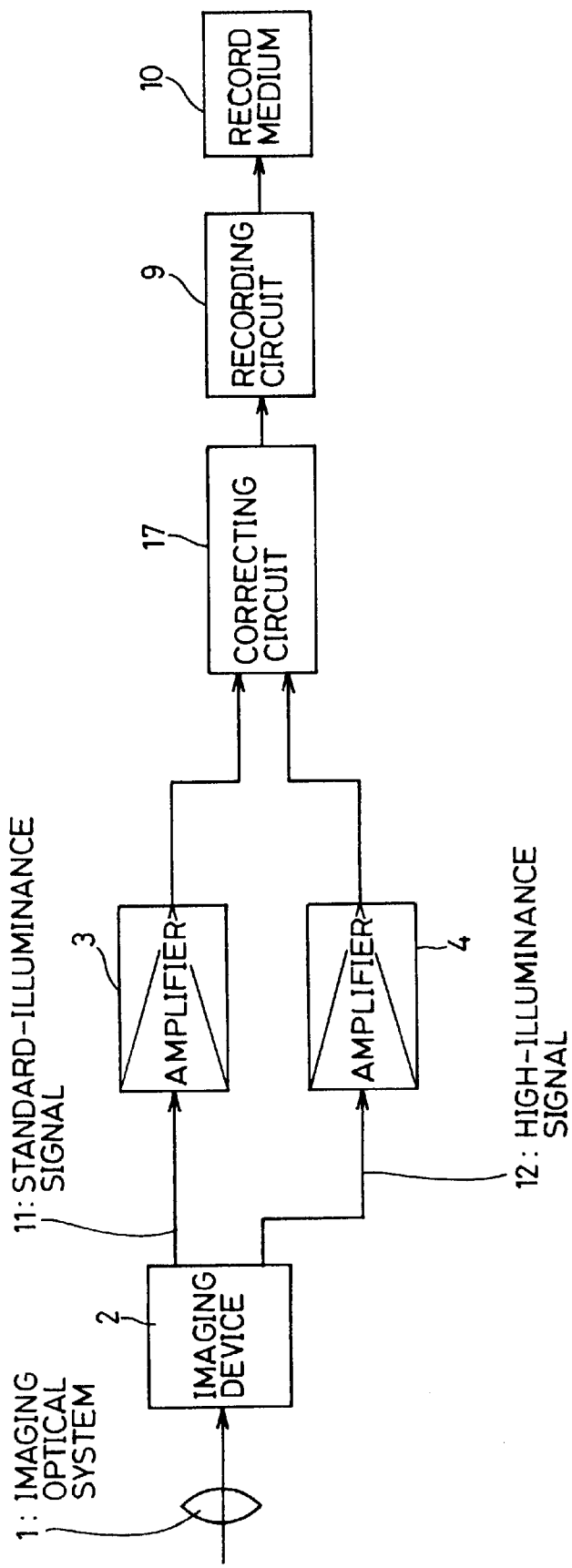

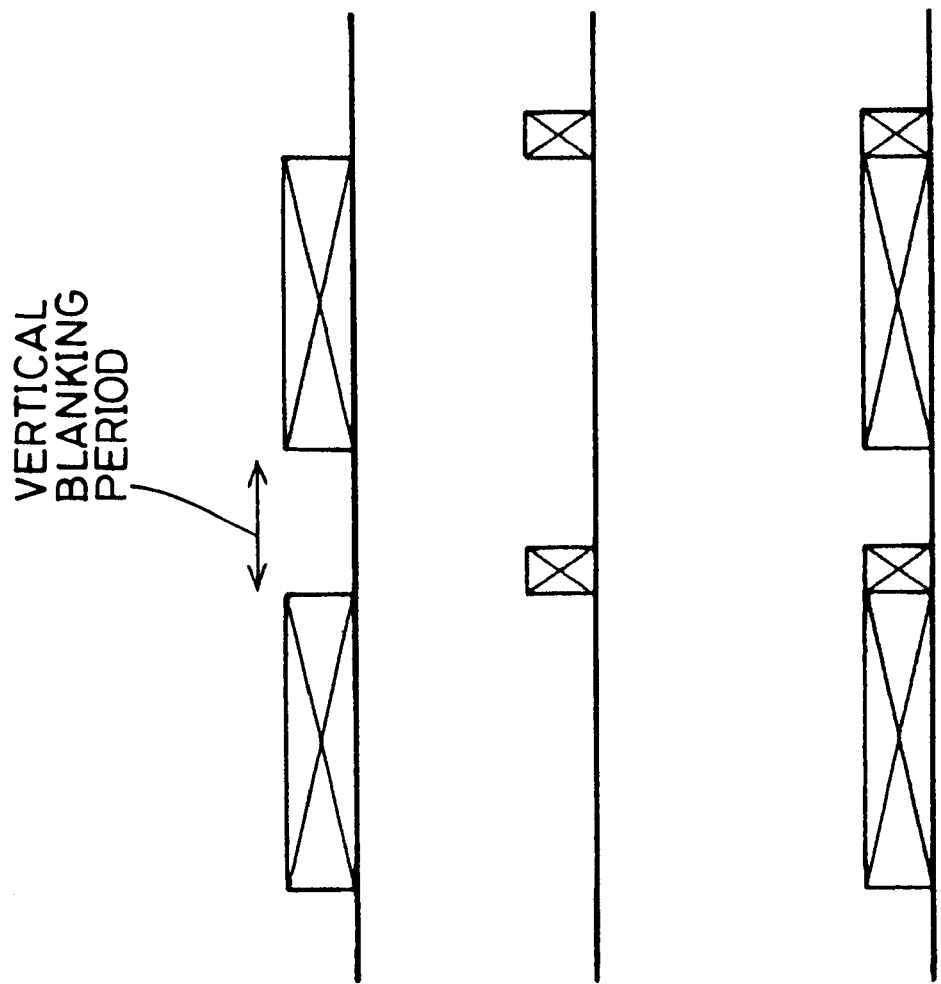

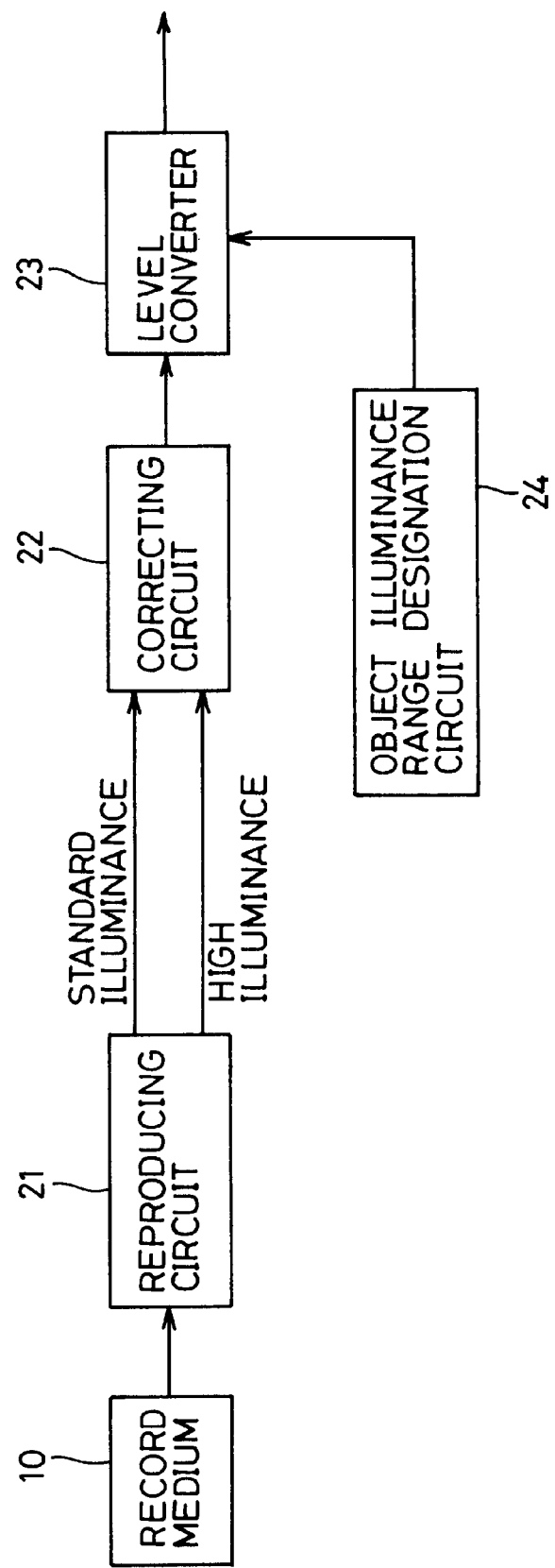

IMAGE RECORDING APPARATUS AND IMAGE REPRODUCING APPARATUS

BACKGROUND OF THE INVENTION

1. Field of the Invention

The invention relates to an image recording apparatus useful in a video camera, a still camera, or the like which records a video signal from, for example, an imaging device having an expanded range of the amount of incident light, on a record medium, and also to an image reproducing apparatus which, when a video signal is reproduced from a medium on which the video signal is recorded by the image recording apparatus and then output, adjusts the luminance of the video signal in accordance with, for example, instructions from the user.

2. Description of the Related Art

Conventionally, a CCD which is used in a video camera or a still camera has a narrow dynamic range. Therefore, the illuminance range to be imaged is adjusted to an optimum one by controlling the amount of light incident on the CCD by means of a mechanical aperture while seeing an image of an object, or by controlling the period of accumulating signal charges by means of an electronic shutter. A video signal is obtained with adjusting the illuminance range in an optimum manner by means of the aperture or the electronic shutter, and then recorded on a medium such as a tape or a disk.

FIG. 28 shows an imaging method in the prior art. As shown in FIG. 28, the object illuminance in outdoors where the sun shines is different from that in a dark room by the factor of 100 to 1,000 times. To comply with this, when imaging is to be conducted in a dark room, the size of the aperture is increased, and, when imaging is to be conducted in bright outdoors, the size of the aperture is reduced, thereby obtaining an optimum illuminance.

According to the prior art method, when there exist both a dark room and bright outdoors in an imaging area, however, it is impossible to set the aperture to be a size at which imaging can be simultaneously conducted on both the dark room and the bright outdoors. This produces a problem as discussed below. The case where the photographer places emphasis on the inside of a room and takes an image to record it on a record medium with setting the aperture so as to correspond to the dark room will be considered. When the record medium is thereafter subjected to reproduction and the image is observed on a display apparatus, the portion of the image which corresponds to the outdoors appears as whiteout. Even when the observer wishes to see the outdoor portion, therefore, it is impossible to see the outdoor portion.

In contrast, in the case where an image is taken and recorded with setting the aperture so as to correspond to the bright outdoors, even when the observer wishes to see the room portion in reproduction, it is impossible to see the room portion because the room portion appears as blackout.

As seen from the above, in the prior art, only an image in which the object illuminance range is restricted can be recorded, thereby producing a problem in that it is impossible to see a portion in which the object illuminance in reproduction is largely different from that in imaging.

SUMMARY OF THE INVENTION

In order to attain the object, for example, the image recording apparatus of the invention comprises: imaging means for obtaining two video signals of different signal charge accumulation periods, in a given signal charge accumulation period which is represented by a field or a frame of a video signal; and means for separately recording the two video signals on a record medium, or means for selecting or correcting the two video signals for each predetermined number of pixels and then recording the video signals.

For example, the image reproducing apparatus of the invention comprises: video signal reproducing means for reproducing two video signals which have different signal charge accumulation periods and which are recorded on an image record medium separately or with being selected or corrected for each predetermined number of pixels; object illuminance range designating means for designating an object illuminance range which is to be displayed or output, or region designating means for designating a region for an image; and level converting means for converting a luminance level of a reproduced video signal.

According to the image recording apparatus of the invention having the above-mentioned configuration, for example, the imaging means for obtaining two video signals of different signal charge accumulation periods obtains, in a standard charge accumulation period, a video signal produced by imaging an object of a standard illuminance, and, in a charge accumulation period which is shorter than the standard period, a video signal produced by imaging an object of a high illuminance. The two obtained video signals are recorded on a record medium by video signal recording medium as they are, with being selected for each pixel, or with being corrected with each other, whereby a video signal of an object having a wide luminance distribution can be recorded.

According to the image reproducing apparatus of the invention, for example, video signals of the standard illuminance and the high illuminance are reproduced from a record medium, and the luminance level of a video signal which is indicated by a user through the object illuminance range designating means or the region designating means is converted by the level converting means into a luminance level which is suitable for a video signal outputting apparatus, thereby allowing portions which are largely different in object illuminance, to be selectively displayed or output in reproduction.

The first invention is an image recording apparatus which comprises plural imaging means which have different signal charge accumulation periods in one field or one frame, and recording means for recording a whole or a part of plural video signals obtained in the signal accumulation periods, on a predetermined record medium.

The second invention is an image recording apparatus according to said first invention,
wherein said recording means records a whole of the plural video signals on the record medium.

The third invention is an image recording apparatus according to said first invention,
wherein said apparatus further comprises selecting means for selecting one of the plural video signals output from said imaging means, on the basis of a predetermined criterion, and said recording means records the selected video signal.

The 4th invention is an image recording apparatus according to said third invention,
wherein the plural video signals which have different signal charge accumulation periods are two kinds of video signals or first and second video signals, the first video signal being longer in signal charge accumulation period than the second video signal, and, in the selection of one of the video signals on the basis of the predetermined criterion, when a value of the first video signal is smaller than a predetermined threshold, the first video signal is selected, and, when the value of the first video signal is not smaller than the threshold, the second video signal is selected.

The 5th invention is an image recording apparatus according to said 4th invention, wherein said apparatus further comprises identification information adding means for adding an identification information to the selected video signal, the identification information indicating which one of the two kinds of video signals is selected by said selecting means as the one video signal.

The 6th invention is an image recording apparatus according to said 4th invention, wherein said selecting means comprises correcting means for, at least when the second video signal is to be selected, correcting the second video signal to be selected with using the second video signal and the threshold, and outputting the corrected second video signal.

The 7th invention is an image recording apparatus according to said 6th invention, wherein said recording means comprises parameter recording means for recording a parameter which is used in the correction by said correcting means, on the record medium.

The 8th invention is an image recording apparatus according to said 6th invention, wherein said recording means comprises parameter multiplexing means for recording a parameter which is used in the correction by said correcting means, with being multiplexed with the second video signal, on the record medium.

The 9th invention is an image reproducing apparatus which comprises:

reading means for reading out plural video signals which have different signal charge accumulation periods and are recorded on the record medium by said image recording apparatus according to said second invention;

selecting/outputting means for selecting one of the plural read out video signals, on the basis of a predetermined criterion, and outputting the selected video signal;

image displaying/outputting means for displaying or outputting an image with using the selected signal; and object illuminance range designating means for designating an object illuminance range which is to be reproduced by said displaying/outputting means, wherein the selected video signal is to be displayed or output by said image displaying/outputting means, at least in the designated object illuminance range.

The 10th invention is an image reproducing apparatus according to said 9th invention, wherein said apparatus further comprises luminance level changing means for, when a luminance level of the selected signal in the designated object illuminance range exceeds a maximum limit of said image displaying/outputting means, changing the luminance level of the selected signal in the object illuminance range so as to become lower than the maximum limit.

The 11th invention is an image reproducing apparatus which comprises:

reading means for reading out plural video signals which have different signal charge accumulation periods and which are recorded on the record medium by said image recording apparatus according to said third invention;

image displaying/outputting means for displaying or outputting an image with using the read out signal; and object illuminance range designating means for designating an object illuminance range which is to be reproduced by said displaying/outputting means, wherein the read out signal is to be displayed or output by said image displaying/outputting means, at least in the designated object illuminance range.

The 12th invention is an image reproducing apparatus according to said 11th invention, wherein said apparatus further comprises luminance level changing means for, when a luminance level of the read out signal in the designated object illuminance range exceeds a maximum limit of said image displaying outputting means, changing the luminance level of the read out signal in the object illuminance range so as to become lower than the maximum limit.

The 13th invention is an image reproducing apparatus which comprises:

reading means for reading out plural video signals which have different signal charge accumulation periods and which are recorded on the record medium by said image recording apparatus according to said second invention;

selecting/outputting means for selecting one of the plural read out video signals, on the basis of a predetermined criterion, and outputting the selected video signal;

image displaying(outputting means for displaying or outputting an image with using the selected signal;

region designating means for designating a predetermined region in an image region which can be subjected to the display or the output in said displaying/outputting means;

calculating means for calculating distribution of the number of pixels in the designated region with respect to a luminance; and object illuminance range determining means for, with using a result of the calculation, determining an object illuminance range which is to be reproduced by said displaying/outputting means, in the designated region, wherein a signal in the designated region is to be subjected to the display or the output by said image displaying/outputting means, in the determined object illuminance range.

The 14th invention is an image reproducing apparatus according to said 13th invention, wherein said apparatus further comprises luminance level changing means for, when a luminance level of a signal in the designated region in the determined object illuminance range exceeds a maximum limit of said image displaying/outputting means, changing the luminance level of the signal in the designated range so as to become lower than the maximum limit.

The 15th invention is an image reproducing apparatus which comprises:

reading means for reading out plural video signals which have different signal charge accumulation periods and which are recorded on the record medium by said image recording apparatus according to said third invention;

image displaying/outputting means for displaying or outputting an image with using the read out signal;

region designating means for designating a predetermined region in an image region which can be subjected to the display or the output in said displaying/outputting means;

calculating means for calculating distribution of the number of pixels in the designated region with respect to a luminance; and object illuminance range determining means for, with using a result of the calculation, determining an object illuminance range which is to be reproduced by said displaying/outputting means, in the designated region, wherein a signal in the designated region is to be subjected to the display or the output by said image displaying/outputting means, in the determined object illuminance range.

The 16th invention is an image reproducing apparatus according to said 15th invention, wherein said apparatus further comprises luminance level changing means for, when a luminance level of a signal in the designated region in the determined object illuminance range exceeds a maximum limit of said image displaying/outputting means, changing the illuminance level of the signal in the designated range so as to become lower than the maximum limit.

The 17th invention is an image reproducing apparatus according to said 11th or 15th invention, wherein the plural video signals which have different signal charge accumulation periods are two kinds of video signals or first and second video signals, the first video signal being longer in signal charge accumulation period than the second video signal, and, in the selection of one of the video signals on the basis of the predetermined criterion in said image recording apparatus, when a value of the first video signal is smaller than a predetermined threshold, the first video signal is selected, and, when the value of the first video signal is not smaller than the threshold, the second video signal is selected.

The 18th invention is an image reproducing apparatus according to said 17th invention, wherein said image recording apparatus comprises identification information adding means for adding anidentification information to the selected video signal, the identification information indicating which one of the two kinds of video signals is selected by said selecting means as the one video signal.

The 19th invention is an image reproducing apparatus according to said 17th invention, wherein said selecting means of said image recording apparatus comprises correcting means for, at least when the second video signal is to be selected, correcting the second video signal to be selected with using the second video signal and the threshold, and outputting the corrected second video signal.

The 20th invention is an image reproducing apparatus according to said 19th invention, wherein said recording means of said image recording apparatus comprises parameter recording means for recording a parameter which is used in the correction by said correcting means, on the record medium.

The 21th invention is an image reproducing apparatus according to said 19th invention, wherein said recording means of said image recording apparatus comprises parameter multiplexing means for recording a parameter which is used in the correction by said correcting means, with being multiplexed with the second video signal, on the record medium.

As a result, for example, the image recording apparatus of the invention records two video signals of the standard illuminance and a high illuminance which are obtained in different signal charge accumulation periods.

The image reproducing apparatus of the invention uses a video signal which is recorded by the image recording apparatus as described above.

According to the configuration described above, the invention can provide an image recording apparatus and an image reproducing apparatus which allow portions largely different in object illuminance to be observed in reproduction.

In other words, in the image reproducing apparatus of the invention, for example, the luminance level of a video signal read out from a record medium is converted in accordance with designation of the luminance range or region designation conducted by the user, whereby even portions which are largely different in object illuminance are allowed to be selectively displayed or output in reproduction.

BRIEF DESCRIPTION OF THE DRAWINGS

FIGS. 3(A) and 3(B) are diagrams illustrating the structure of an imaging device;

FIG. 8 is a block diagram of an image recording apparatus which is a third embodiment of the invention;

FIGS. 12(A) to 12(C) are diagrams illustrating the operation of a multiplexer in the fifth embodiment of the invention;

FIG. 13 is a block diagram of an image recording apparatus which is a sixth embodiment of the invention;

[Legend of the Reference Numerals]

| | |
|---|---|
| 2 | imaging device |
| 9 | recording circuit |
| 10 | record medium |
| 13 | selecting circuit |
| 14, 15 | gate circuit |
| 16 | identification bit adding circuit |
| 17, 22, 29 | correcting circuit |
| 18 | correction parameter recording circuit |
| 19 | multiplexer |
| 21, 27 | reproducing circuit |
| 23 | level converter |
| 24 | object illuminance range designation circuit |
| 25 | region designation circuit |
| 26 | luminance range calculating circuit |
| 28 | identification circuit |
| 30 | correction parameter reproducing circuit |
| 31 | correction signal converter |
| 32 | separation circuit |

DESCRIPTION OF THE PREFERRED EMBODIMENTS

Hereinafter, embodiments of the invention will be described with reference to accompanying drawings.

Embodiment 1

A first embodiment of the invention will be described with reference to FIGS. 1, 2, 3(A), 3(B), 4(A), and 4(B).

Figure 1:
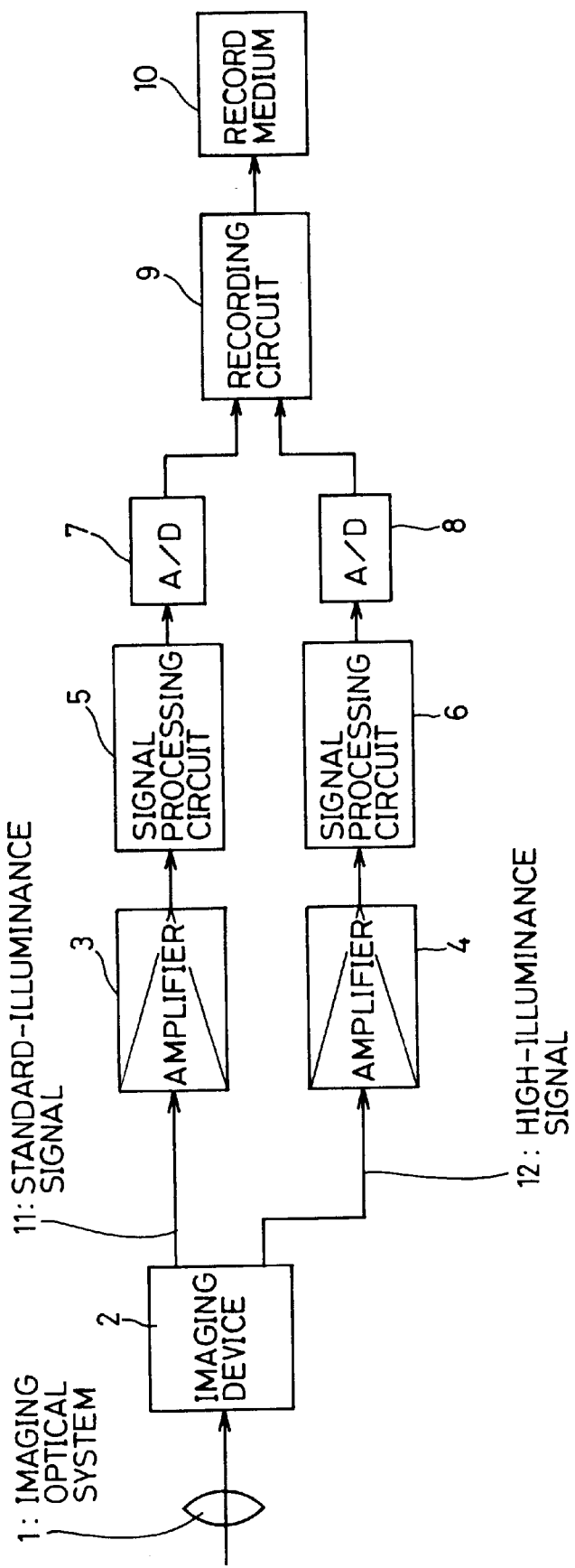
FIG. 1 is a block diagram of an image recording apparatus which is a first embodiment of the invention.

FIG. 1 shows the configuration of the image recording apparatus of the invention. Image light of an object is incident on the light receiving face of an imaging device 2 through an imaging optical system 1. The imaging device 2 outputs two signals of different signal charge accumulation periods, for example, a standard-illuminance signal 11 which is read out with an accumulation period of $\frac{1}{60}$ sec. and functions as the first video signal in the invention, and a high-illuminance signal 12 which is read out with an accumulation period of $\frac{1}{1,000}$ sec. and functions as the second video signal in the invention. The standard-illuminance signal 11 and the high-illuminance signal 12 are amplified by amplifiers 3 and 4, subjected to a predetermined signal processing in signal processing circuits 5 and 6, and then converted into digital signals by A/D converters 7 and 8, respectively. The digitized video information is recorded on a record medium 10 via a recording circuit 9.

Figure 6:
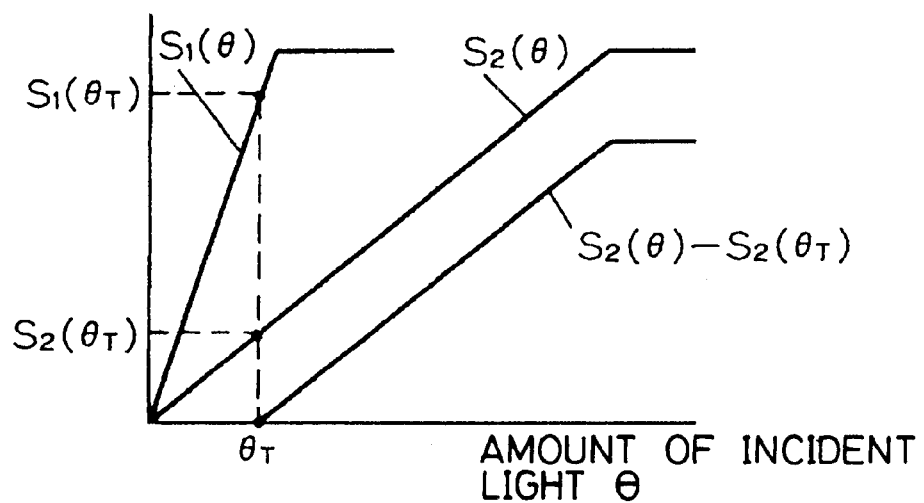
FIG. 6 is a graph showing relationships between the amount of incident light and an output of an amplifier.

On the record medium 10, both the standard-illuminance signal 11 which is read out with an accumulation period of $\frac{1}{60}$ sec. and the high-illuminance signal 12 which is read out with an accumulation period of $\frac{1}{1,000}$ sec. are recorded. When the amount of incident light is very large, for example, a saturated signal which is in saturation is recorded as the standard-illuminance signal 11 is recorded together with the high-illuminance signal 12 for the same pixel which is not in saturation. It is needless to say that the saturated signal is not necessary in reproduction. However, this configuration has the merit that the apparatus can be simplified in structure. This operation is shown in FIG. 6 which will be described in detail later. In FIG. 6, $S_1(\theta)$ indicates the standard-illuminance signal 11 and $S_2(\theta)$ indicates the high-illuminance signal 12. The horizontal linear portion which is at the right end of the signal $S_1(\theta)$ indicates that the signal is saturated.

Figure 2:
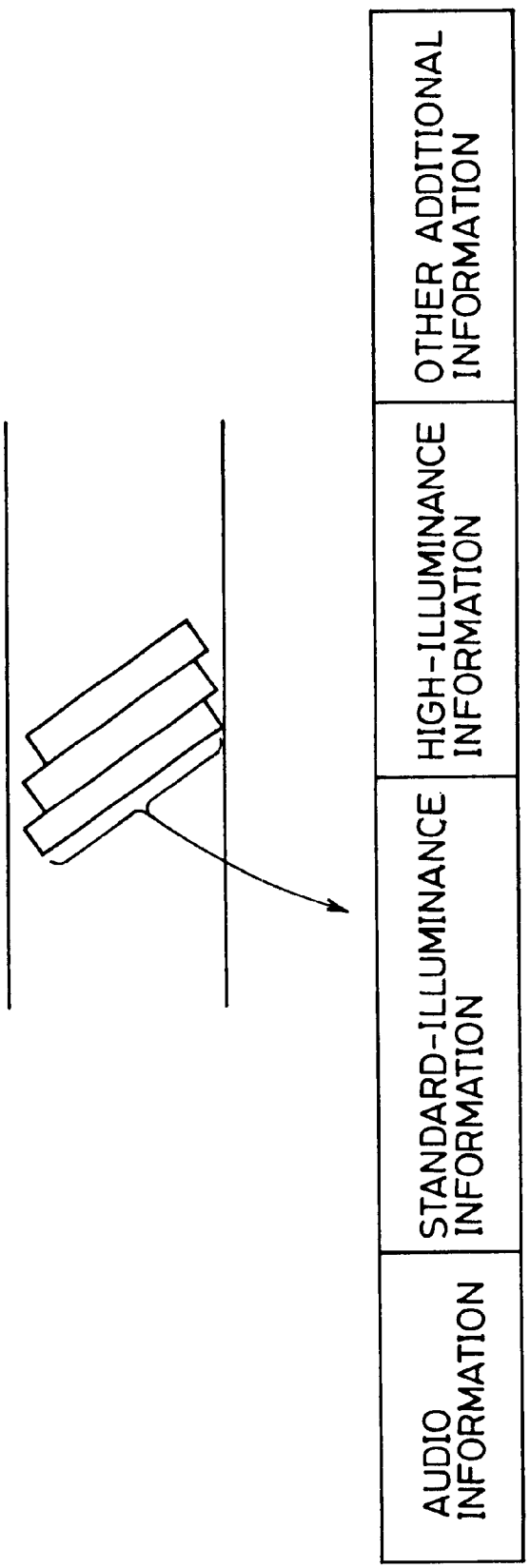
FIG. 2 is a diagram illustrating a record format of a magnetic tape used in the first embodiment of the invention.

FIG. 2 shows an example of the record format used in the case where the record medium is a magnetic tape. In addition to video information, audio information and other additional information are recorded on the magnetic tape. As described above, as the video information, two kinds of video information, i.e., standard-illuminance video information and high-illuminance video information are separately recorded.

An imaging device from which two output signals of different signal charge accumulation periods can be read out at the substantially same time is disclosed in Japanese patent application No. HEI5-145887. FIGS. 3(A) and 3(B) show the structure of the disclosed imaging device. The imaging device has eight gates per two pixels and can transmit signals of three packets per two pixels at the maximum (see FIG. 3(B)). In FIG. 3(A), signals of two packets per two pixels can be transmitted at the maximum. According to this structure, two signals of different accumulation periods (e.g., $\frac{1}{60}$ sec. and $\frac{1}{1,000}$ sec.) can be independently read out in two-pixel blocks. The configuration of FIG. 3(A) can be applied to a device of the interlace type and that of FIG. 3(B) to a device of the noninterlace type.

Figure 27:
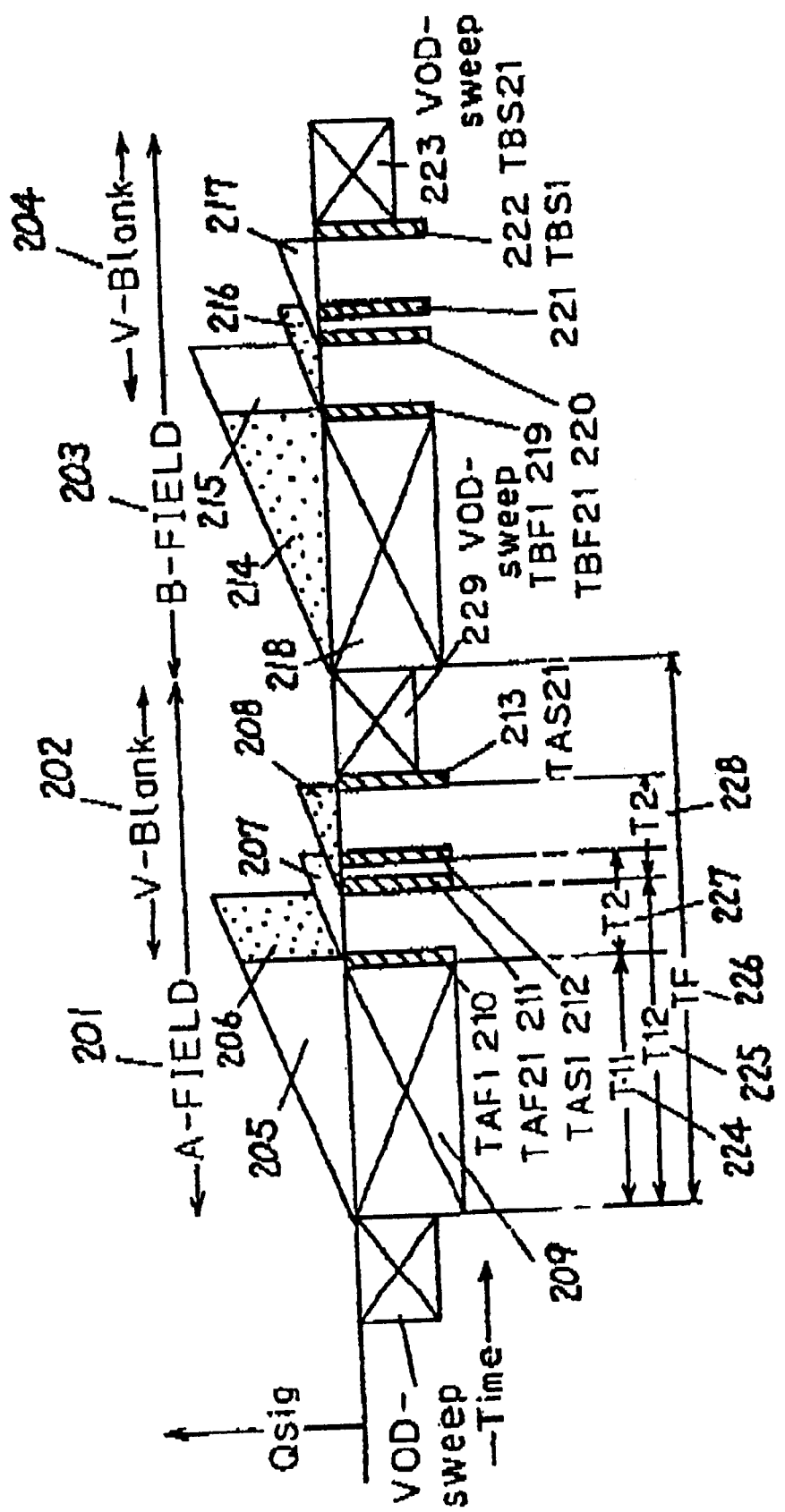
FIG. 27 is a diagram showing timings of accumulating, reading, and transferring two signal charges of different accumulation periods.
Figure 28:
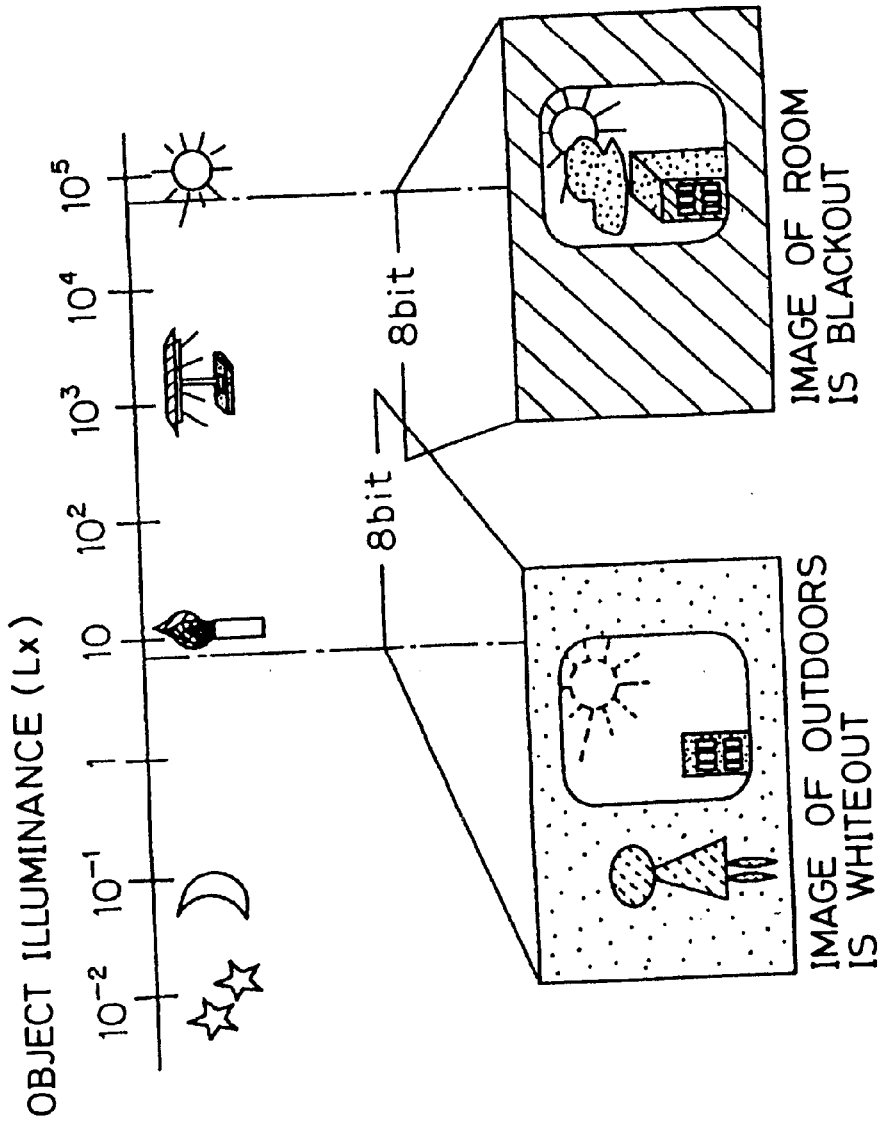
FIG. 28 is a diagram illustrating an imaging method in the prior art.

FIG. 27 shows timings of accumulating, reading, and transferring two signal charges of different accumulation periods for odd- and even-line pixels in A- and B-FIELDs in a usual TV frame. The timing of starting the accumulation period in the odd-line pixels is previously made coincident with that in the even-line pixels by the known VOD-sweep.

In each even-line pixel, an even-line first signal charge 205 is formed by a signal incident during a period T11. The reading operation to the VCCD is conducted at a timing 210. By contrast, in each odd-line pixel, an odd-line first signal charge 206 is formed by a signal incident during a period T12. The reading operation to the VCCD is conducted at a timing 211. During the V-Blank period, in the even-line pixel, an even-line second signal charge 207 is formed by a signal incident during a period T2 (227), and the reading operation to the VCCD is conducted at a timing 212. By contrast, in the odd-line pixel, an odd-line second signal charge 208 is formed by a signal incident during a period 228 which is an accumulation period set to be equal to T2, and the reading operation to the VCCD is conducted at a timing 213. Also in B-FIELD, the same operations are conducted.

Figure 4A:
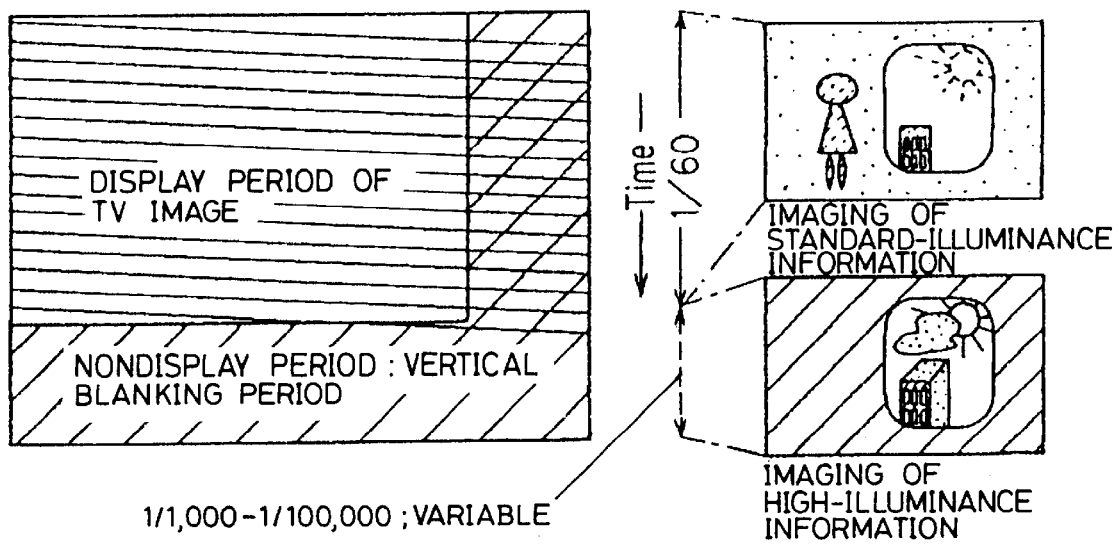
FIGS. 4(A) and 4(B) are diagrams illustrating the performance of the imaging device.
Figure 4B:
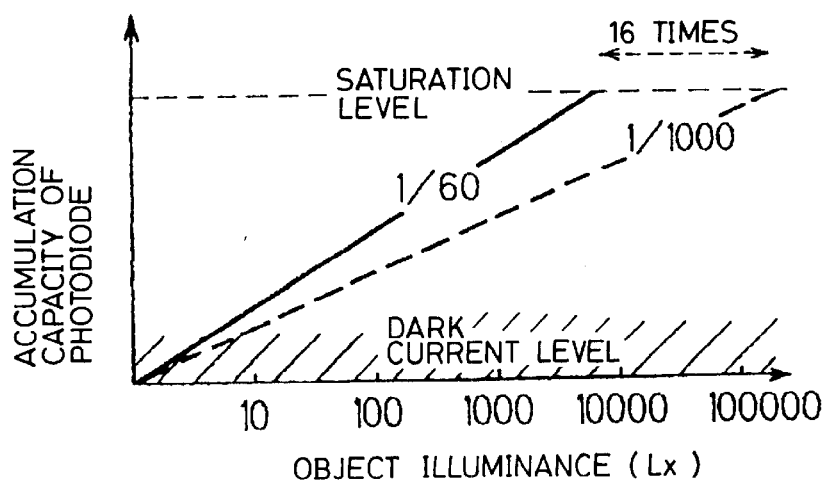

FIGS. 4(A) and 4(B) are diagrams illustrating the performance of the imaging device. Standard-illuminance information can be obtained by setting an accumulation period of 1/60 sec., and high-illuminance information by setting a variable accumulation period of 1/1,000 to 1/100,000 sec. When the accumulation period for high-illuminance information is set to be 1/1,000 sec., high-illuminance information can cope with an object illuminance which is 16 times that of standard-illuminance information. When the accumulation period for high-illuminance information is set to be 1/100,000 sec., high-illuminance information can cope with an object illuminance which is 1,600 times that of standard-illuminance information.

In the embodiment configured as described above, two kinds of video information, or standard-illuminance video information and high-illuminance video information are recorded on a record medium in the imaging process, and hence the video information can be recorded with a wide dynamic range. In the above, the embodiment in which a video signal is converted into a digital signal and then recorded has been described. Alternatively, a video signal may be subjected to the analog recording process. The record medium is not restricted to a magnetic tape and may have the form of a disk or a solid-state memory.

Embodiment 2

Figure 5:
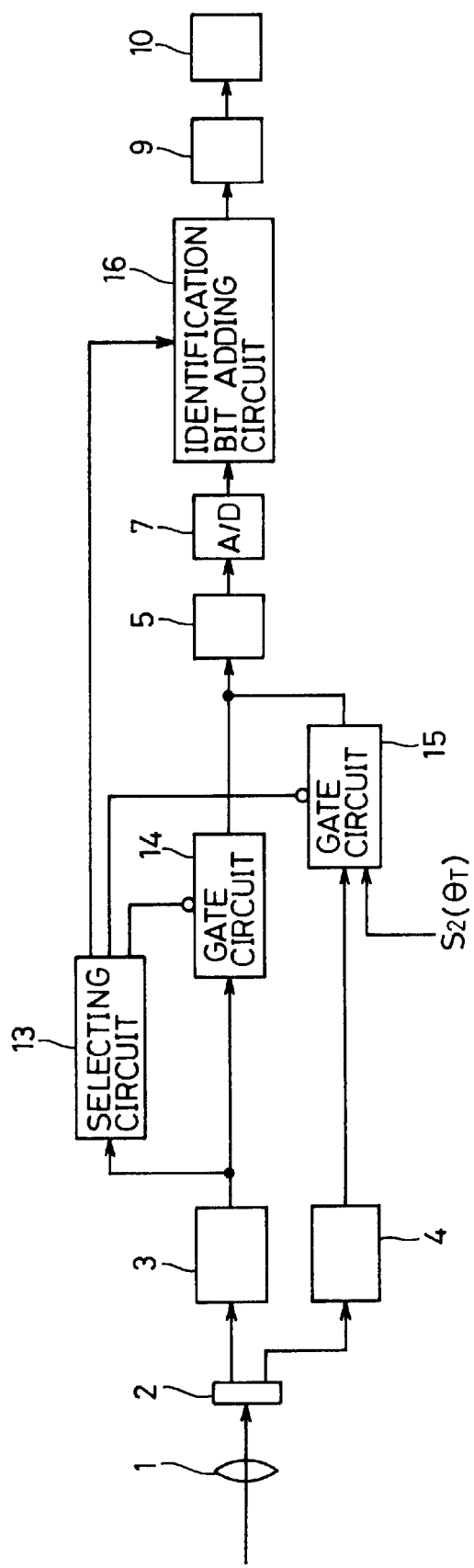
FIG. 5 is a block diagram of an image recording apparatus which is a second embodiment of the invention.

FIG. 5 shows the configuration of an image recording apparatus which is a second embodiment of the invention. The components identical with those of FIG. 1 are designated by the same reference numerals and their description is omitted.

In the first embodiment, standard-illuminance information and high-illuminance information are separately recorded with including a saturated signal which is not necessary in reproduction. By contrast, in the embodiment, one of standard-illuminance information and high-illuminance information is selected in the unit of two pixels and then recorded. In other words, in the embodiment, a saturated signal which is not necessary in reproduction is not recorded. In order to realize this function, the embodiment comprises a selecting circuit 13, gate circuits 14 and 15, and an identification bit adding circuit 16. The selecting means in the invention comprises the selecting circuit 13, the gate circuits 14 and 15, etc.

The operation of the selecting circuit 13 and the gate circuits 14 and 15 will be described with reference to FIG. 6.

FIG. 6 shows relationships between the standard-illuminance output $S_1(\theta)$ of the amplifier 3 and the high-illuminance utput $S_2(\theta)$ of the amplifier 4 with respect to the amount of incident light $\theta$ which is shown as the abscissa. In the figure, $\theta_T$ indicates a predetermined amount of light for determining $S_1(\theta_T)$ which serves as a threshold. The amount of light $\theta_T$ is slightly smaller than the amount of incident light at which the signal $S_1(\theta)$ indicative of the standard illuminance is saturated.

When $S_1(\theta)$ is smaller than the threshold $S_1(\theta_T)$, the selecting circuit 13 opens the gate circuit 14, and, when $S_1(\theta)$ is not smaller than $S_1(\theta_T)$, the selecting circuit opens the gate circuit 15. The gate circuit 15 receives $S_2(\theta)$ and $S_2(\theta_T)$ and outputs the difference $\{S_2(\theta)-S_2(\theta_T)\}$. In this way, the selecting circuit 13 selects the video signal to be supplied to the signal processing circuit 5, in the unit of two pixels.

The difference $\{S_2(\theta)-S_2(\theta_T)\}$ is output because a certain amount of information can be recorded in a reduced number of bits as compared with the case where the signal $S_2(\theta)$ is recorded as it is. Furthermore, the difference is used for the sake of convenience in reproduction conducted in a reproducing apparatus. Specifically, the process of ensuring the continuity between the standard-illuminance signal output $S_1(\theta)$ and the high-illuminance signal output $S_2(\theta)$ can be conducted more simply in the reproducing apparatus.

The identification bit adding circuit 16 adds to bits of the digitized video signal an identification bit indicating which one of the two video signals (standard-illuminance and high-illuminance) of different signal charge accumulation periods is selected in the unit of two pixels by the selecting circuit 13. For example, seven bits are assigned to the video signal and the one-bit identification bit is added. When the identification bit is set at the most significant bit, also a reproducing apparatus which does not identify the identification bit can conduct video reproduction without incongruity.

Figure 7:
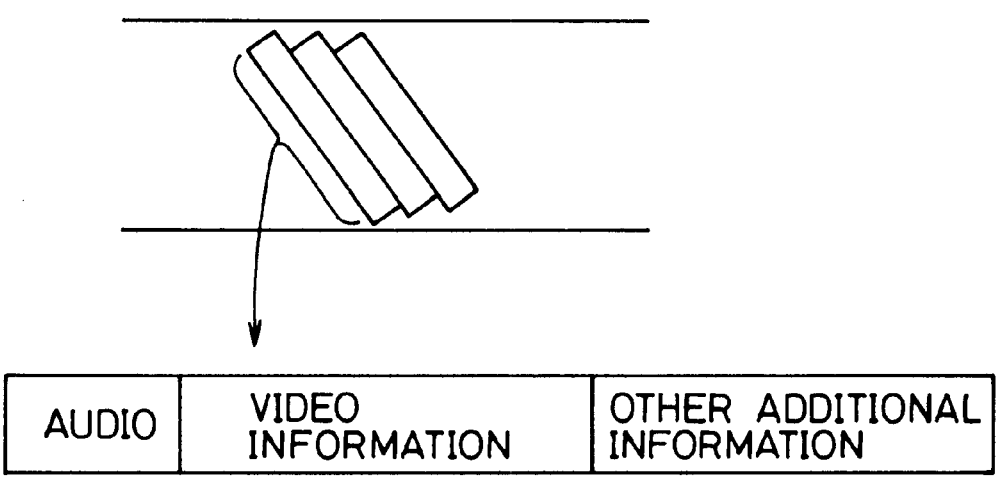
FIG. 7 is a diagram illustrating a record format of a magnetic tape used in the second embodiment of the invention.

FIG. 7 shows an example of the record format used in the case where the record medium is a magnetic tape. In addition to video information, audio information and other additional information are recorded on the magnetic tape. As described above, as the video information, one of two kinds of video information, i.e., standard-illuminance video information and high-illuminance video information is selected in the unit of two pixels and then recorded.

As described above, in the image recording apparatus of the embodiment, one of two kinds of video information, i.e., standard-illuminance video information and high-illuminance video information is selected in the unit of two pixels and then recorded on the record medium so that a saturated signal which is not necessary in reproduction is not recorded. Consequently, the recording of video information with a wide dynamic range can be efficiently conducted.

Embodiment 3

FIG. 8 shows the configuration of an image recording apparatus which is a third embodiment of the invention.

The components identical with those of FIG. 5 are designated by the same reference numerals and their description is omitted.

The embodiment in which the analog recording is conducted will be described. Alternatively, the digital recording may be conducted. In the case of the digital recording, an A/D converter is connected at the output of a correcting circuit 17.

The embodiment is mainly different from the second embodiment in the following point. In the second embodiment, when the standard signal $S_1(\theta)$ is not lower than the threshold $S_1(\theta_T)$, the difference $\{S_2(\theta)-S_2(\theta_T)\}$ between the high-illuminance signal and the predetermined value is recorded. By contrast, in the embodiment, the high-illuminance signal is corrected with using the difference $\{S_2(\theta)-S_2(\theta_T)\}$ and the threshold $S_1(\theta_T)$ and then recorded. Therefore, the embodiment is provided with the correcting circuit 17 which functions as the correcting means in the invention.

The correcting circuit 17 comprises the selecting circuit 13, the gate circuits 14 and 15, the signal processing circuit 5, and the A/D converter 7 which are described in Embodiment 2 with reference to FIG. 5. The correcting circuit 17 further comprises in addition to these components an adding circuit (not shown) between the gate circuit 15 and the signal processing circuit 5. The adding circuit is a circuit for adding the threshold $S_1(\theta_T)$ to the output of the gate circuit 15 as described later. In the embodiment, the identification bit adding circuit 16 is not necessary.

The correction method in the correcting circuit 17 will be described with reference to FIGS. 9(A) and 9(B).

Figure 9A:
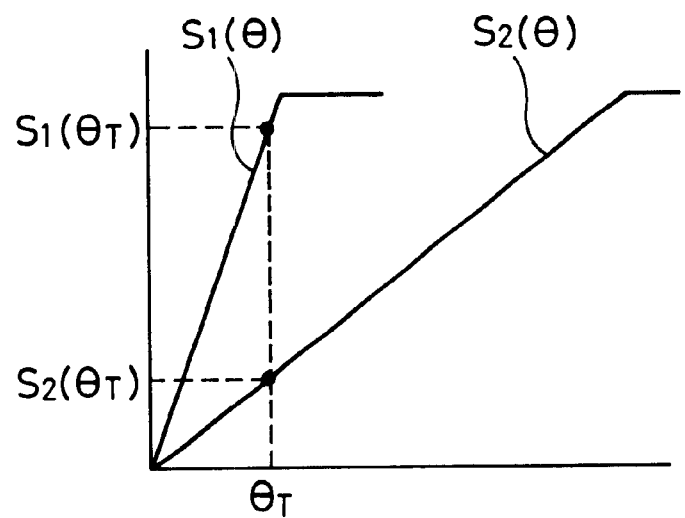
FIGS. 9(A) and 9(B) are graphs illustrating a correcting method in the third embodiment of the invention.

FIG. 9(A) shows the relationships between the two signals of different signal charge accumulation periods which are output from the imaging device, with respect to the amount of light incident on the imaging device.

$S_1(\theta)$ indicates a signal indicative of the standard illuminance which is read out with an accumulation period of 1/60 sec., and $S_2(\theta)$ indicates a signal indicative of the high illuminance which is read out with an accumulation period of 1/1,000 sec. $S(\theta)$ shown in FIG. 9(B) indicates a signal which is corrected by the correcting circuit 17. The correction in the correcting circuit 17 is calculated by using (Expression 1) below.

when $S_1(\theta) < S_1(\theta_T)$ $S(\theta) = k_1 \cdot S_1(\theta)$ when $S_1(\theta) \geq S_1(\theta_T)$ $S(\theta) = k_1 \cdot S_1(\theta_T) + k_2 \cdot \{S_2(\theta) - S_2(\theta_T)\}$ (Expression 1)

where $\theta_T$ is a predetermined amount of light for determining $S_1(\theta_T)$ which serves as the threshold and identical with that described above, and $k_1$ and $k_2$ are predetermined compression correction coefficients for bit-compression of the two signals and are a number which is not greater than 1.

Figure 9B:
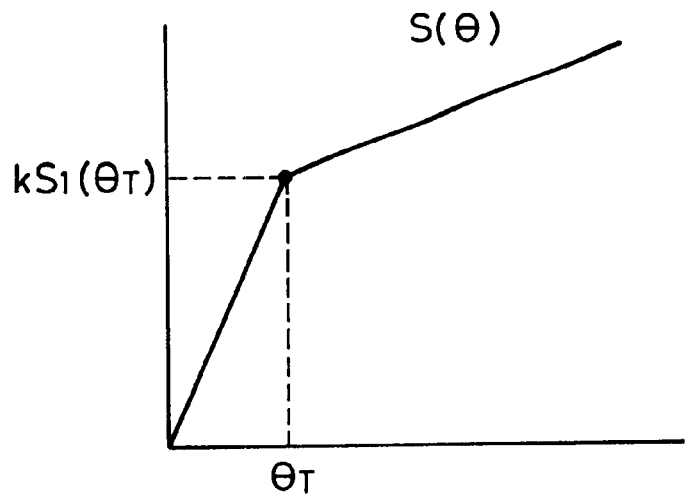

As described above, in the image recording apparatus of the embodiment, two kinds of video information, or standard-illuminance video information and high-illuminance video information are corrected by the correcting circuit 17 and then recorded on the record medium as one video information which is continuous as shown in FIG. 9(B). Consequently, the video information can be recorded with a wide dynamic range.

Embodiment 4

Figure 10:
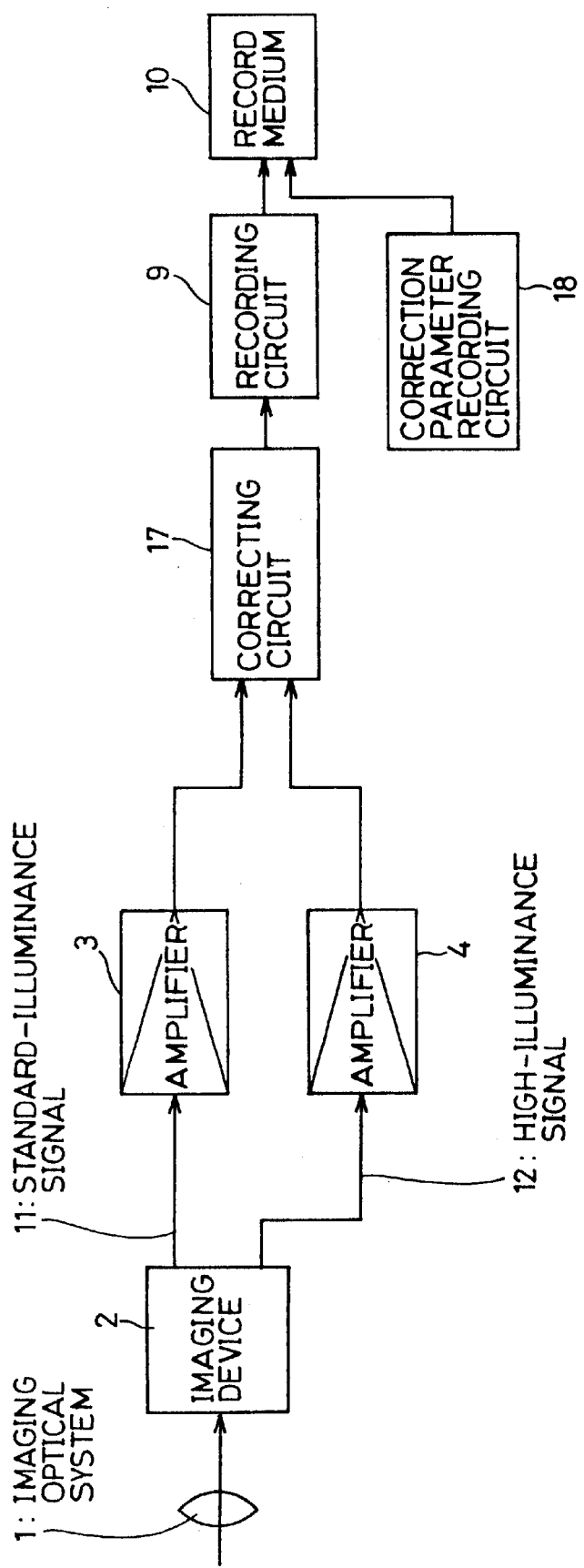
FIG. 10 is a block diagram of an image recording apparatus which is a fourth embodiment of the invention.

FIG. 10 shows the configuration of an image recording apparatus which is a fourth embodiment of the invention. In the embodiment, the operation of recording corrected video information is conducted in the same manner as the third embodiment. The components identical with those of FIG. 8 are designated by the same reference numerals and their description is omitted.

In the third embodiment, only video information is recorded on the record medium 10. The embodiment is different from the third embodiment in that also the correction parameters used in the above-described correction are recorded. To comply with this, the embodiment is provided with a correction parameter recording circuit 18 which functions as the parameter recording means in the invention. The parameter recording means in the invention comprises the recording circuit 9 and the correction parameter recording circuit 18.

The correction parameter recording circuit 18 records correction parameters, i.e., $k_1$, $k_2$, $S_1(\theta_T)$, and $S_2(\theta_T)$ used in the correcting circuit 17 which is described in the third embodiment. The correction parameter recording circuit 18 records the correction parameters in a portion of the record medium 10 different from that where video information is recorded.

Embodiment 5

Figure 11:
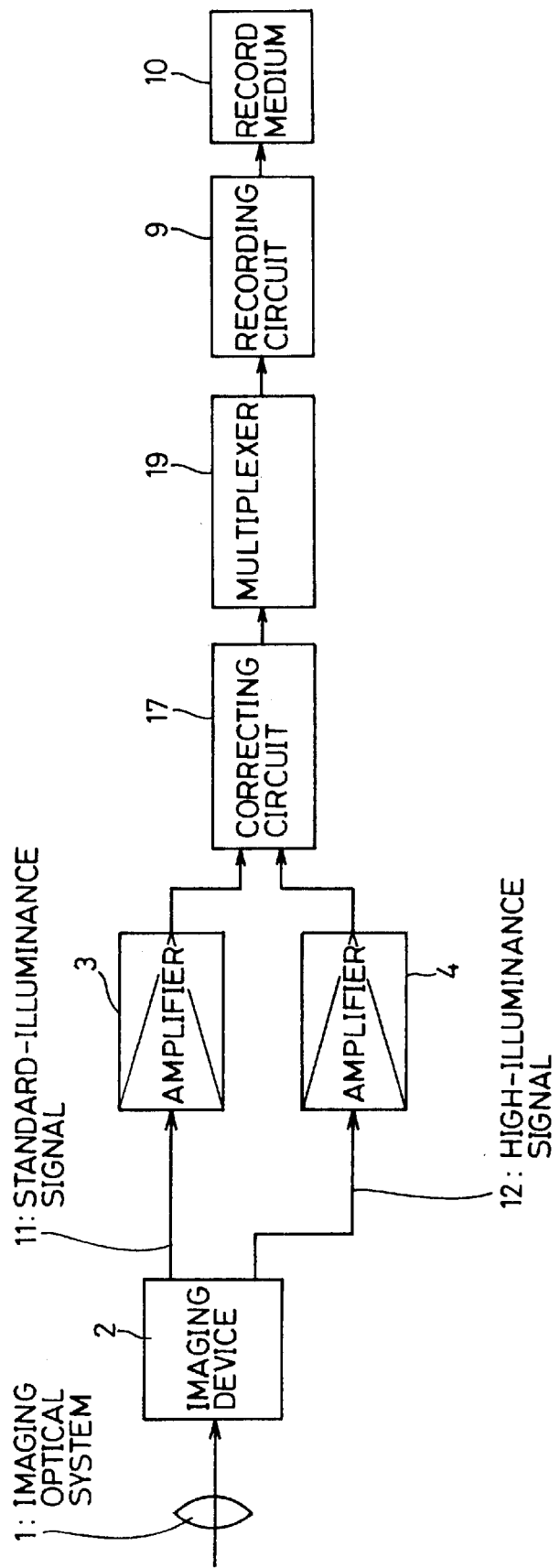
FIG. 11 is a block diagram of an image recording apparatus which is a fifth embodiment of the invention.

FIG. 11 shows the configuration of an image recording apparatus which is a fifth embodiment of the invention. In the embodiment, the correction parameters are recorded on the record medium 10 in the same manner as the fourth embodiment. The embodiment is different from the fourth embodiment in that the correction parameters are recorded with being multiplexed with a video signal.

To comply with this, the embodiment is provided with a multiplexer 19 which functions as the parameter multiplexing means in the invention. The recording means in the invention comprises the recording circuit 9 and the multiplexer 19.

The operation of the multiplexer 19 will be described with reference to FIGS. 12(A) to 12(C). FIG. 12(A) shows a video signal after correction, FIG. 12(B) shows a signal indicative of a correction parameter, and FIG. 12(C) shows a signal obtained by multiplexing the correction parameter signal with the video signal. In this way, the multiplexer 19 multiplexes the correction parameter signal during the vertical blanking period of the video signal.

Embodiment 6

FIG. 13 shows the configuration of an image reproducing apparatus which is a sixth embodiment of the invention. The embodiment reproduces video information from the record medium 10 on which standard-illuminance video information and high-illuminance video information are separately recorded by the image recording apparatus of the first embodiment, and outputs a video signal which is to be displayed on a display apparatus or output by a printer.

The embodiment comprises a correcting circuit 22, a level converter 23, and an object illuminance range designation circuit 24 so that an image in an object illuminance range designated by the user is output through a display apparatus or a printer.

Figure 14A:
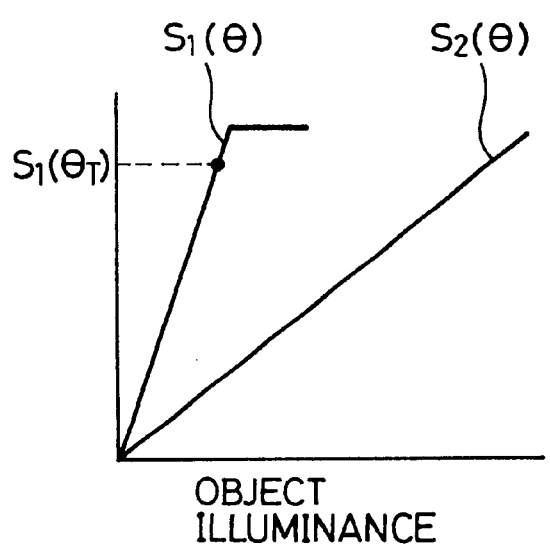
FIGS. 14(A) and 14(B) are graphs illustrating the operation of a correcting circuit in the sixth embodiment of the invention.
Figure 14B:
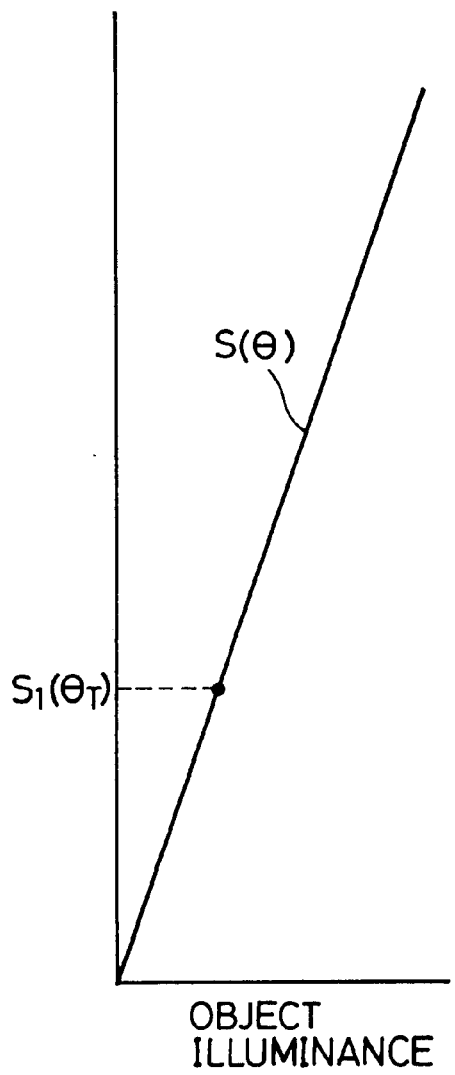

The operation of the correcting circuit 22 will be described with reference to FIGS. 14(A) and 14(B). The standard-illuminance video information and the high-illuminance video information which are reproduced by a reproducing circuit 21 have a luminance with respect to the object illuminance as shown in FIG. 14(A). $S_1(\theta)$ indicates the luminance of the standard illuminance and $S_2(\theta)$ indicates the luminance of the high illuminance. FIG. 14(B) shows results of correction of $S_1(\theta)$ and $S_2(\theta)$ conducted by the correcting circuit 22. The correcting circuit 22 corrects these luminances so that the relationships of the luminances with respect to the object illuminance are linear.

Therefore, the correcting circuit 22 obtains the ratio k of $S_1(\theta a)$ to $S_2(\theta a)$ ($k = S_1(\theta a)/S_2(\theta a)$, where $\theta a \leq \theta_T$) in a pixel where $S_1(\theta)$ has not yet reached the saturation level, and then obtains a correction signal $S(\theta)$ by using (Expression 2) below.

when $S_1(\theta) < S_1(\theta_T)$ $S(\theta) = S_1(\theta)$ when $S_1(\theta) \geq S_1(\theta_T)$ $S(\theta) = k \cdot S_2(\theta)$ (Expression 2)

where $\theta_T$ is a predetermined illuminance which is not higher than the object illuminance at which the signal $S_1(\theta)$ indicative of the standard illuminance is saturated. $\theta_T$ indicates the same amount as $\theta_T$ which has been described in conjunction with FIG. 6.

As shown in FIG. 14(B), in the signal corrected by the correcting circuit 22, the dynamic range of the luminance is very wide and exceeds the luminance range at which an output apparatus can perform the display. Therefore, the whole of the luminance range from a low luminance to a high luminance cannot be simultaneously output through a display apparatus or a printer. Consequently, the user designates the range of the object illuminance to be output, through the object illuminance range designation circuit 24, and the level converter 23 converts the luminance to a level which can be output by the display apparatus or the printer.

Figure 15:
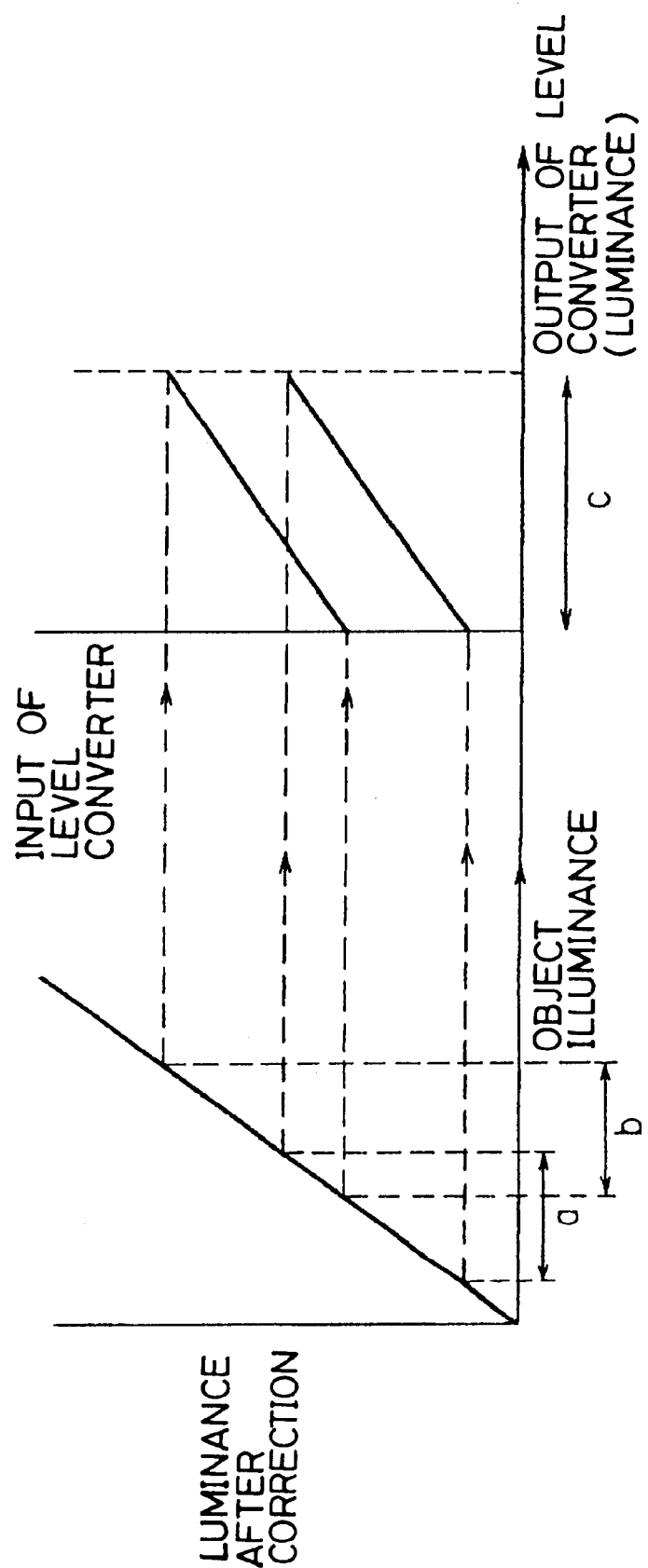
FIG. 15 is a graph illustrating an example of the operation of a level converter in the sixth embodiment of the invention.

FIG. 15 shows the operation of the conversion. In FIG. 15, a and b indicate the ranges of the object illuminance which are designated by the user, and c indicates the luminance level which can be output by the display apparatus or the printer. Therefore, the level converter 23 conducts the conversion from the range a or b to the range c.

Figure 16:
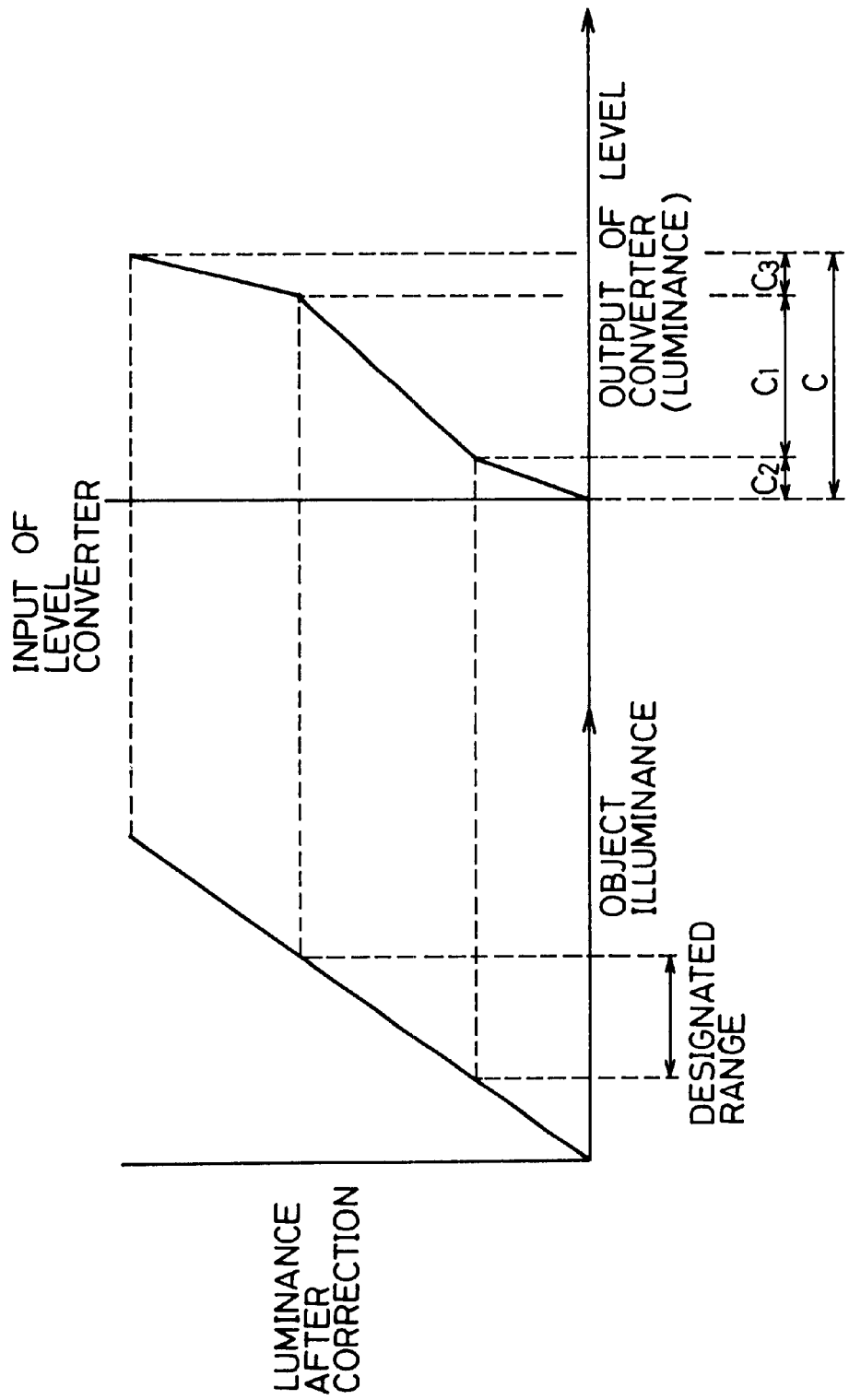
FIG. 16 is a graph illustrating another example of the operation of the level converter in the sixth embodiment of the invention.

FIG. 16 shows another example of the conversion. According to the conversion of FIG. 15, in the range beyond the designated object illuminance range, the luminance is saturated and hence it is impossible to see the image in the range. When the conversion is conducted as shown in FIG. 16, also the image in the range beyond the designated range can be seen. In this case, although not the best, the image quality is at an acceptable level.

In FIG. 16, with respect to the luminance of a video signal, the luminance range within the designated range is indicated by c1, the luminance ranges beyond the designated range are indicated by c2 and c3, and the whole of the luminance range of the video signal is indicated by c (which corresponds to c described in conjunction with FIG. 15). The luminance within the designated range is subjected to the same conversion as that of FIG. 15, and c2 and c3 which are beyond the designated range are subjected to a process of compressing the luminance level.

Embodiment 7

Figure 17:
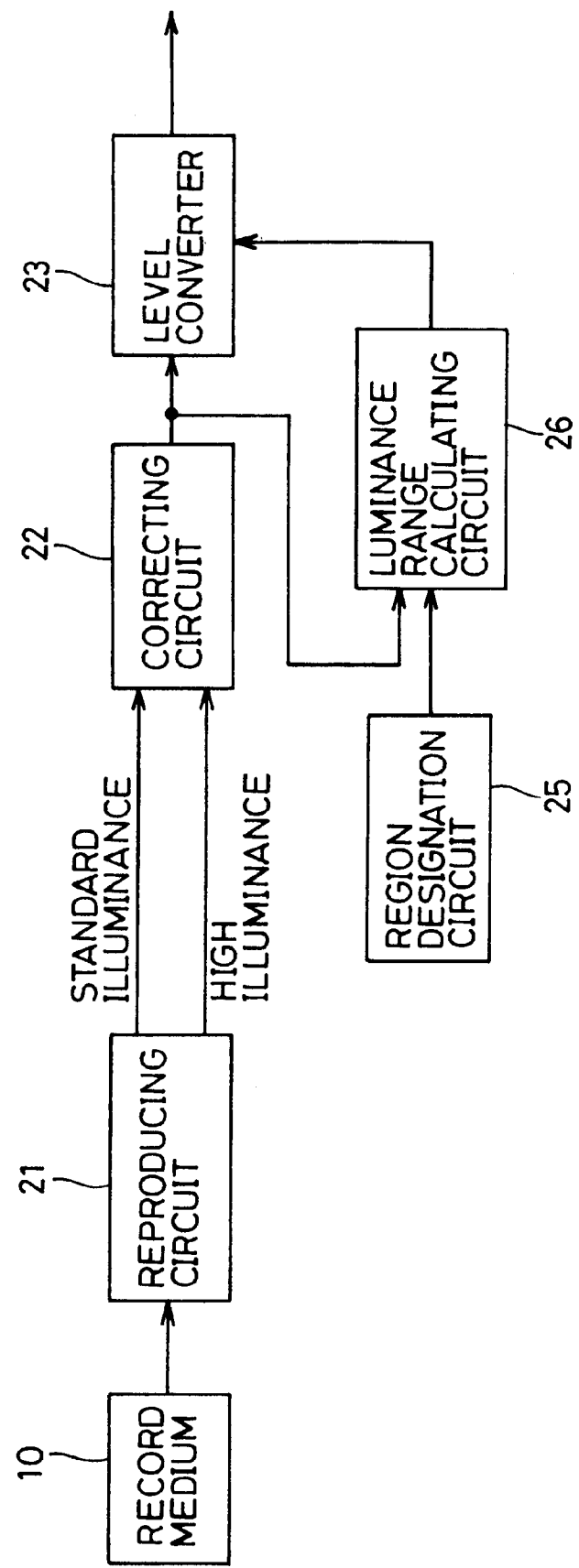
FIG. 17 is a block diagram of an image reproducing apparatus which is a seventh embodiment of the invention.

FIG. 17 shows the configuration of an image reproducing apparatus which is a seventh embodiment of the invention. The embodiment reproduces video information from the record medium 10 on which standard-illuminance video information and high-illuminance video information are separately recorded by the image recording apparatus of the first embodiment, and outputs a video signal which is to be displayed on a display apparatus or output by a printer. The components identical with those of FIG. 13 are designated by the same reference numerals and their description is omitted.

In the embodiment, the operations conducted before and including the correction of video signals of standard illuminance and high illuminance in the correcting circuit 22 are the same as those of the sixth embodiment, and their description is omitted. According to the embodiment, the user can designate a region through a region designation circuit 25 and the image in the designated region can be output to a display apparatus or a printer (displaying/outputting means) so that the image is provided with gradation.

Figure 18:
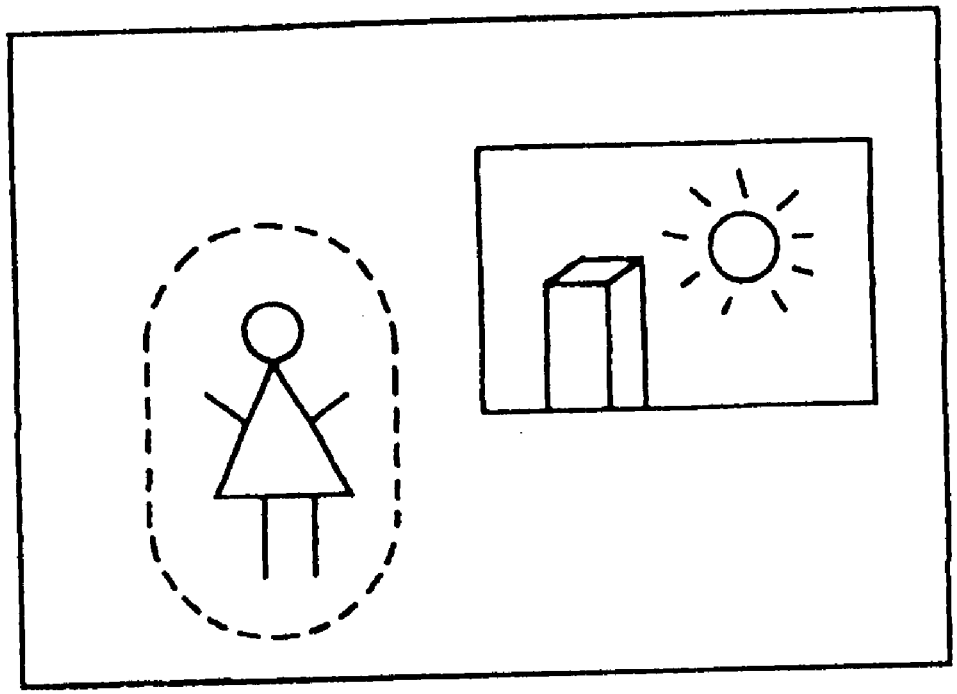
FIG. 18 is a diagram illustrating the operation of a region designating circuit in the seventh embodiment of the invention.

When the user designates the region in the vicinity of an image of a person as indicated by a broken line in FIG. 18 through the region designating means comprising the region designation circuit 25, a luminance range calculating circuit 26 which functions as the calculating means in the invention calculates the luminance range for pixels existing in the designated region. After the luminance range in the designated region is determined, the level converter 23 operates in the same manner as the sixth embodiment so as to convert the luminance level of the range to a luminance level which can be output by the display apparatus or the printer. When the luminance range calculated by the luminance range calculating circuit 26 exceeds the output enabled range of the output apparatus, the clipping level is determined so that the number of pixels to be clipped is reduced to the minimum level.

The luminance range calculating circuit 26 calculates the distribution of the pixel number in the designated region with respect to the luminance, and, with using the calculation result, determines the object illuminance range which is to be reproduced by the displaying/outputting means, in the designated region. For example, the result of calculation of the pixel number distribution may be used in the manner that the pixel number distribution is calculated as described above and the object illuminance range from which the largest number of pixels can be obtained is detected.

Embodiment 8

Figure 19:
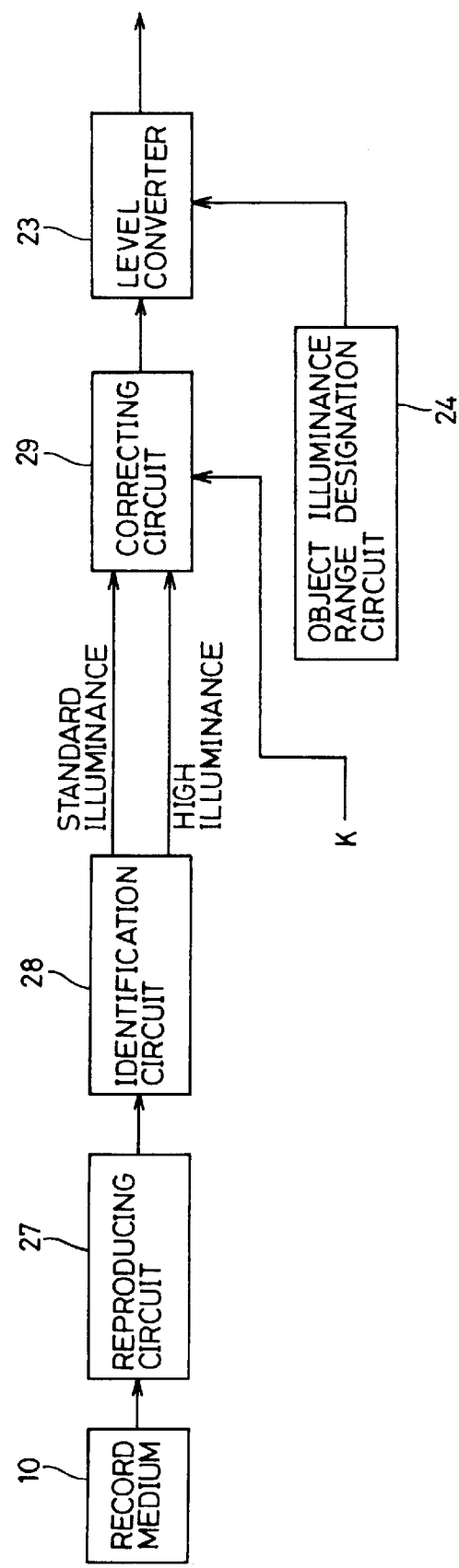
FIG. 19 is a block diagram of an image reproducing apparatus which is an eighth embodiment of the invention.

FIG. 19 shows the configuration of an image reproducing apparatus which is an eighth embodiment of the invention. The embodiment reproduces video information from the record medium 10 on which one of standard-illuminance video information and high-illuminance video information is selected in the unit of two pixels and then recorded as one video information by the image recording apparatus of the second embodiment, and outputs a video signal which is to be displayed on a display apparatus or output by a printer. The components identical with those of FIG. 13 are designated by the same reference numerals and their description is omitted.

In the embodiment, a reproducing circuit 27 reproduces a video signal in which standard illuminance and high illuminance are mixed in the pixel level. As described in the second embodiment, the one-bit identification bit indicating standard illuminance or high illuminance is added to the video signal. In accordance with the identification bit, an identification circuit 28 separates standard illuminance and high illuminance from each other.

A correcting circuit 29 basically operates in the same manner as the correcting circuit 22 described in the sixth embodiment, or corrects standard illuminance and high illuminance so that the relationships of the luminances with respect to the object illuminance are linear. In the embodiment, however, information for each pixel relate only to one of standard illuminance and high illuminance, and hence a pixel which is identified as standard illuminance by the identification circuit 28 is output as it is.

Figure 20:
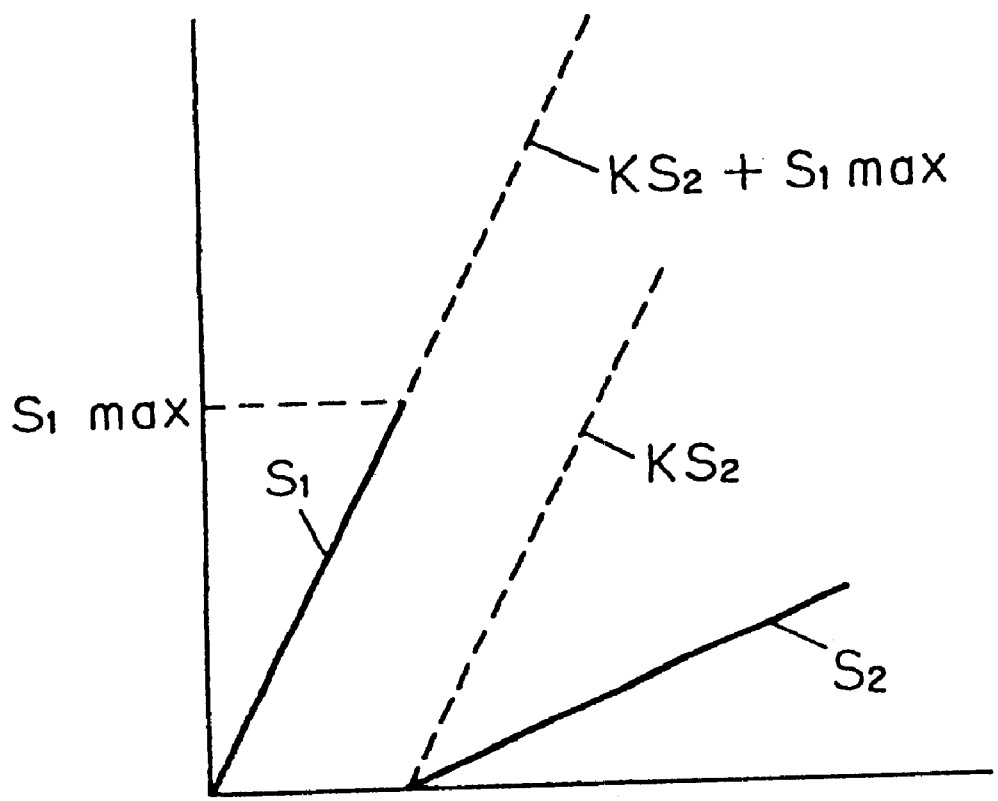
FIG. 20 is a graph illustrating the operation of a correcting circuit in the eighth embodiment of the invention.

By contrast, with respect to a pixel which is identified as high illuminance by the identification circuit 28, the luminance data $S_2$ of high illuminance is multiplied by k and then added to the maximum value $S_1$max of standard illuminance. The addition result is output. FIG. 20 shows this correction. In order to correct standard illuminance and high illuminance so that the relationships of the luminances with respect to the object illuminance are linear, k should be set to be the ratio of the accumulation period of standard illuminance to that of high illuminance (accumulation period of standard illuminance/accumulation period of high illuminance) in imaging. When the ratio of the accumulation periods is not known, the user can set the value of k. While seeing the output result, the user can set the value of k so as not to produce incongruity.

After the correcting circuit 29 corrects standard illuminance and high illuminance, in the same manner as the sixth embodiment, the user designates the range of the object illuminance to be output, through the object illuminance range designation circuit 24, and the level converter 23 converts the luminance to a level which can be output by the display apparatus or the printer. Therefore, the description of the operations is omitted.

Embodiment 9

Figure 21:
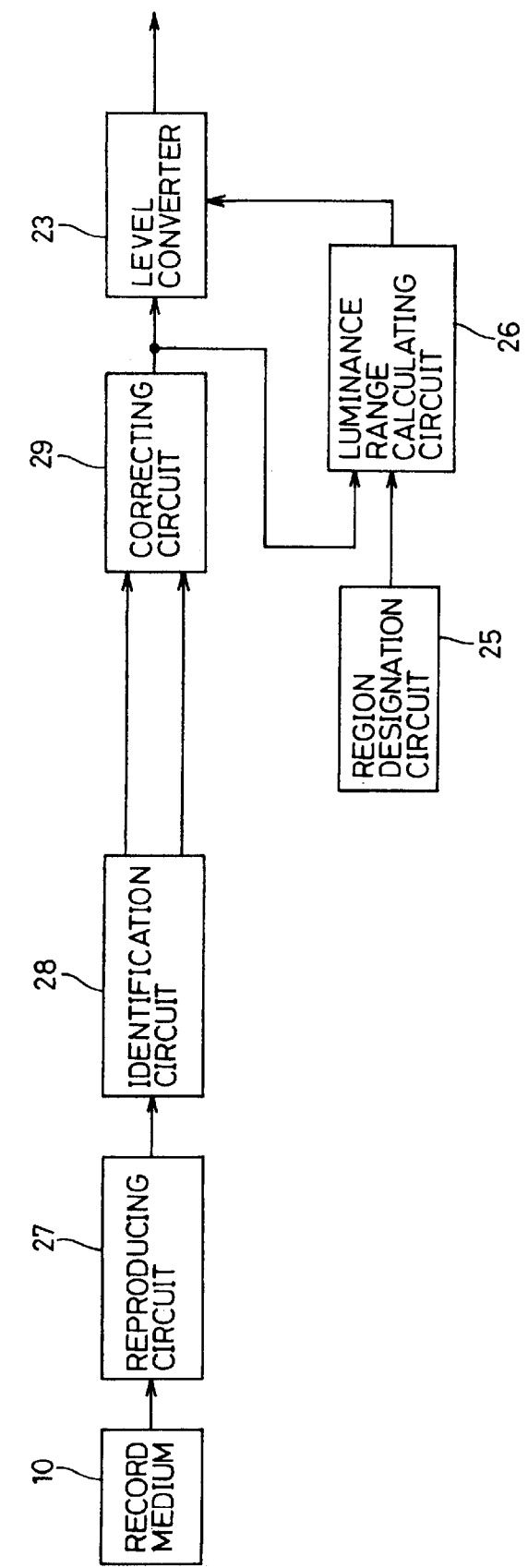
FIG. 21 is a block diagram of an image reproducing apparatus which is a ninth embodiment of the invention.

FIG. 21 shows the configuration of an image reproducing apparatus which is a ninth embodiment of the invention. In the embodiment, the operations conducted before and including the correction of video signals of standard illuminance and high illuminance in the correcting circuit 29 are the same as those of the eighth embodiment. After the correcting circuit 29 corrects standard illuminance and high illuminance, in the same manner as the seventh embodiment, the level converter 23 converts the luminance level to be output to the display apparatus or the printer so that the image of the region which is designated by the user through the region designation circuit 25 is provided with gradation. Therefore, the description of these operations is omitted.

Embodiment 10

Figure 22:
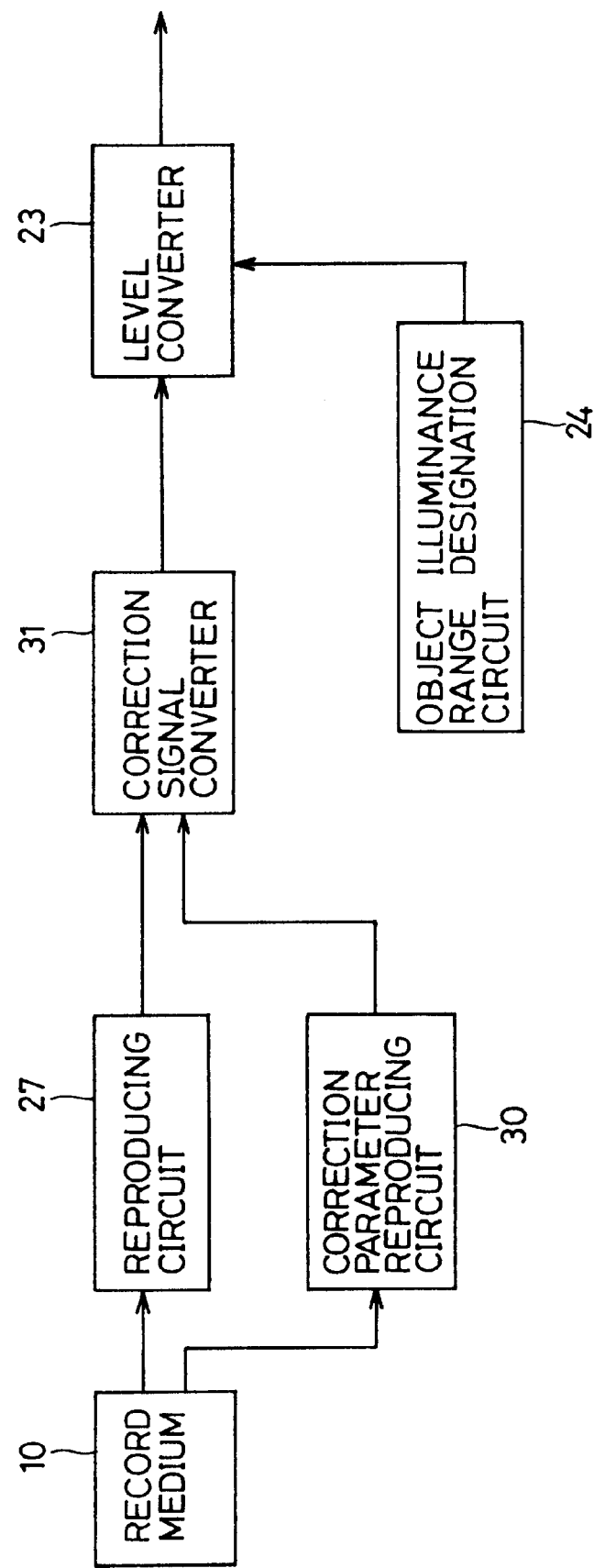
FIG. 22 is a block diagram of an image reproducing apparatus which is a tenth embodiment of the invention.

FIG. 22 shows the configuration of an image reproducing apparatus which is a tenth embodiment of the invention. The embodiment reproduces video information and correction parameters from the record medium 10 on which standard-illuminance video information, corrected high-illuminance video information, and the correction parameters used in the correction are recorded by the image recording apparatus of the fourth embodiment, and outputs a video signal which is to be displayed on a display apparatus or output by a printer.

In the embodiment, the reproducing circuit 27 reproduces a video signal in which standard illuminance and high illuminance are corrected, and a correction parameter reproducing circuit 30 reproduces a signal which has the values of $k_1$, $k_2$, $S_1(\theta_T)$, and $S_2(\theta_T)$ of the correction calculation (Expression 1) described in the fourth embodiment.

Figure 23:
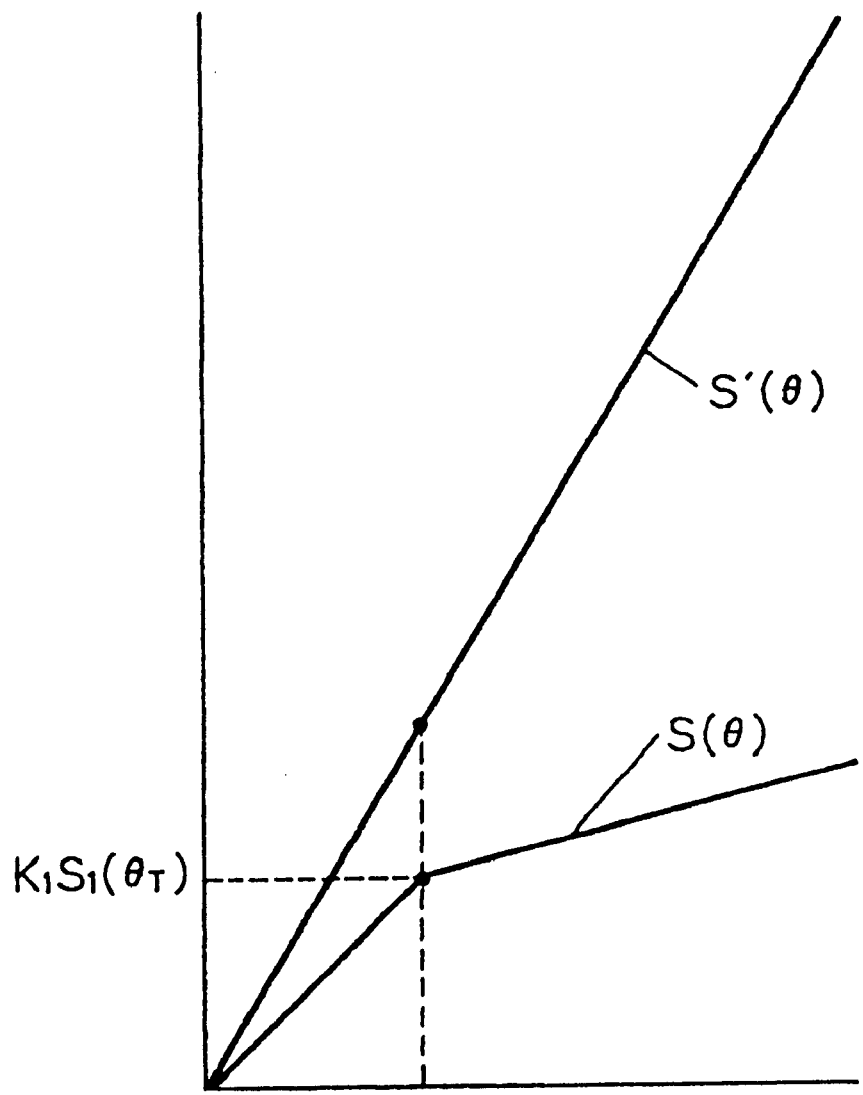
FIG. 23 is a graph illustrating the operation of a corrected signal converter in the tenth embodiment of the invention.

A correction signal converter 31 converts a video signal $S(\theta)$ in which standard illuminance and high illuminance are corrected, into $S'(\theta)$, so that the relationships of the luminances with respect to the object illuminance are linear. The manner of conversion is shown in FIG. 23 and the conversion expression is indicated in (Expression 3) below.

$$\text{when } S(\theta) < k_1 \cdot S_1(\theta_T) \; S'(\theta) = S_1(\theta)/k_1$$

$$\text{when } S(\theta) \geq k_1 \cdot S_1(\theta_T) \; S'(\theta) = (1/k_2) \cdot \{S(\theta) - k_1 \cdot S_1(\theta_T)\} \cdot S_1(\theta T)/S_2(\theta_T) + S_1(\theta_T) \quad \text{(Expression 3)}$$

After a correction signal converter 31 converts the corrected video signal $S(\theta)$ into $S'(\theta)$, in the same manner as the sixth embodiment, the user designates the range of the object illuminance to be output, through the object illuminance range designation circuit 24, and the level converter 23 converts the luminance to a level which can be output by the display apparatus or the printer. Therefore, the description of the operations is omitted.

Embodiment 11

Figure 24:
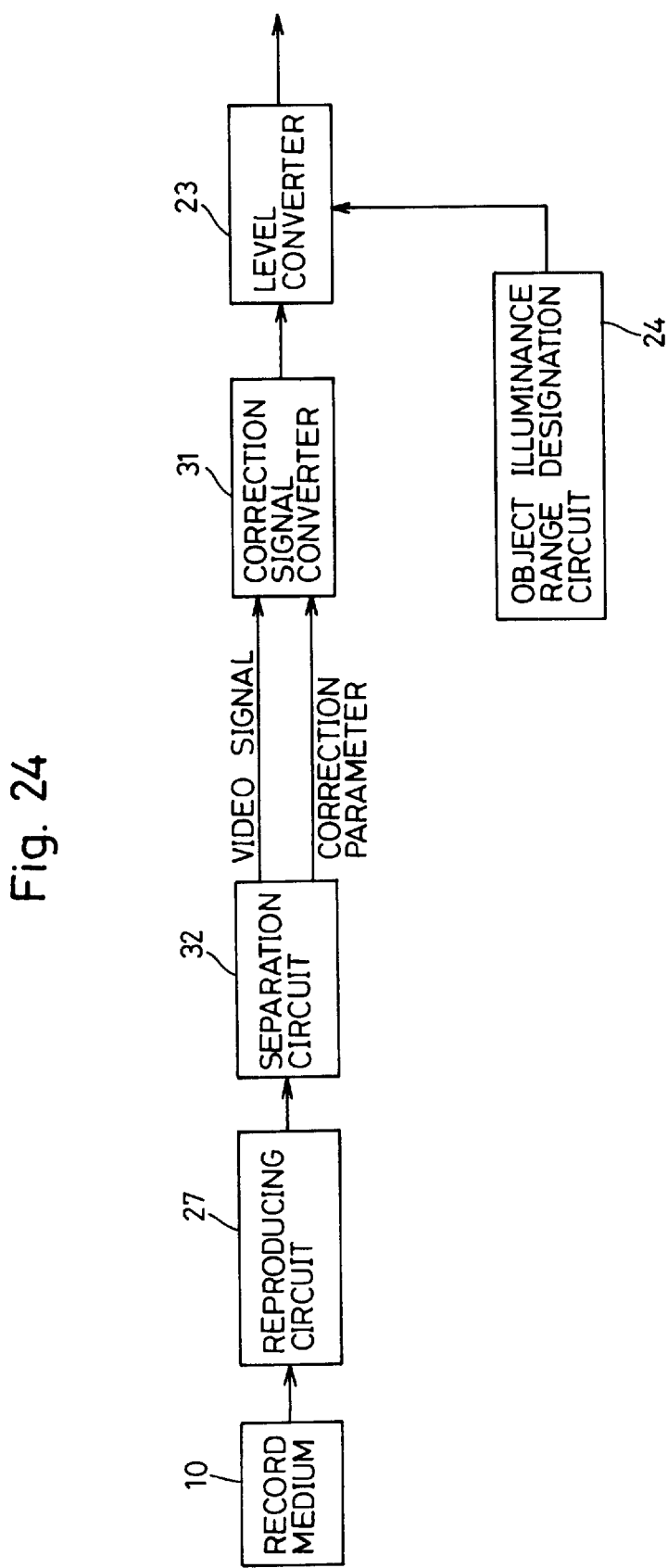
FIG. 24 is a block diagram of an image reproducing apparatus which is an eleventh embodiment of the invention.

FIG. 24 shows the configuration of an image reproducing apparatus which is an eleventh embodiment of the invention. The embodiment reproduces video information and correction parameters from the record medium 10 on which a video signal wherein standard-illuminance video information, corrected high-illuminance video information, and the correction parameters used in the correction are multiplexed is recorded by the image recording apparatus of the fifth embodiment, and outputs a video signal which is to be displayed on a display apparatus or output by a printer. The embodiment is different from the tenth embodiment in that the embodiment comprises a separation circuit 32 for separating correction parameter information which is multiplexed with a video signal, from video information. The separation circuit 32 separates the correction parameter signal which is multiplexed during the vertical blanking period of the video signal as shown in FIG. 12(C), into the video signal and the correction parameter signal shown in FIGS. 12(A) and 12(B). In the portions of the correction signal converter 31 and the followings, the separated video signal and correction parameter are subjected to the same processes as those of the tenth embodiment, and the description of the processes are omitted.

Embodiments 12 and 13

Figure 25:
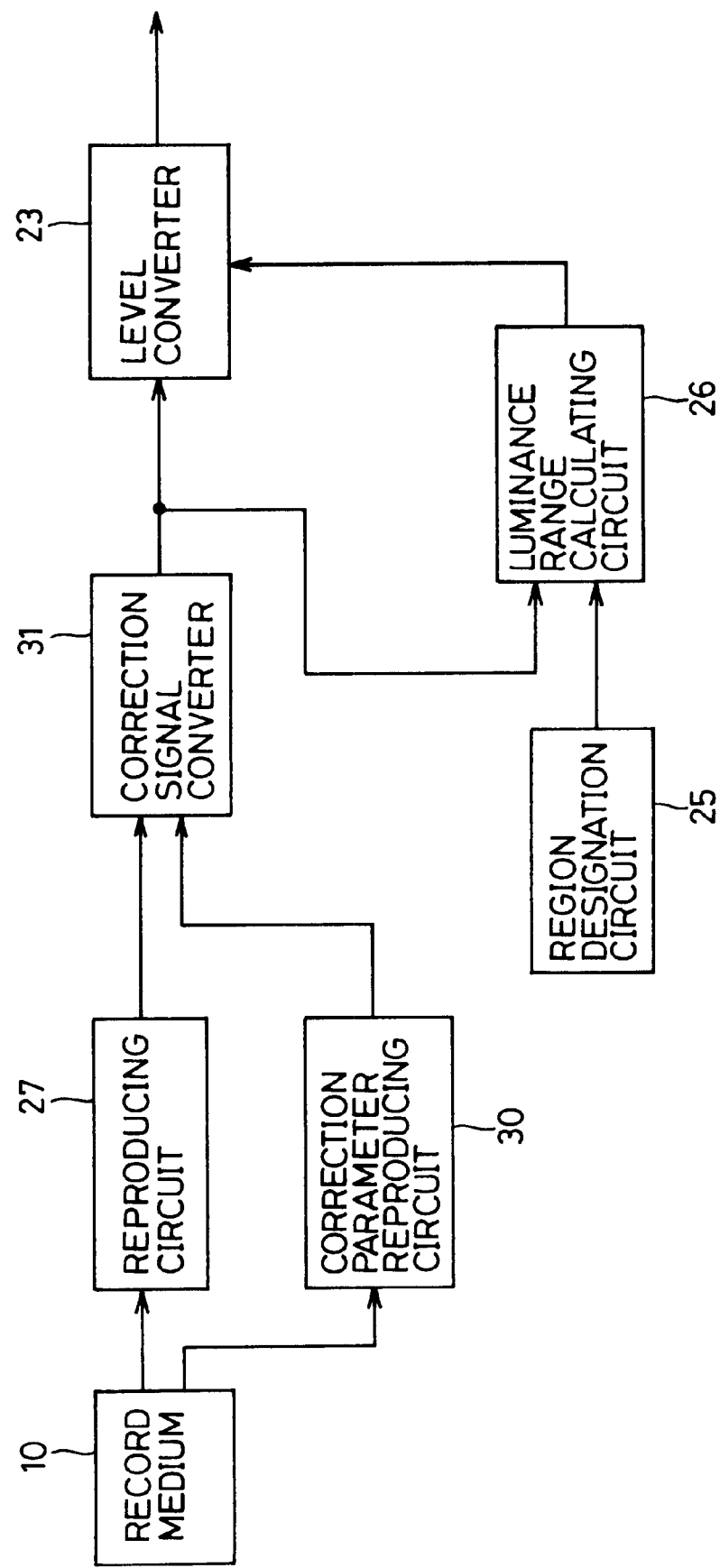
FIG. 25 is a block diagram of an image reproducing apparatus which is a twelfth embodiment of the invention.
Figure 26:
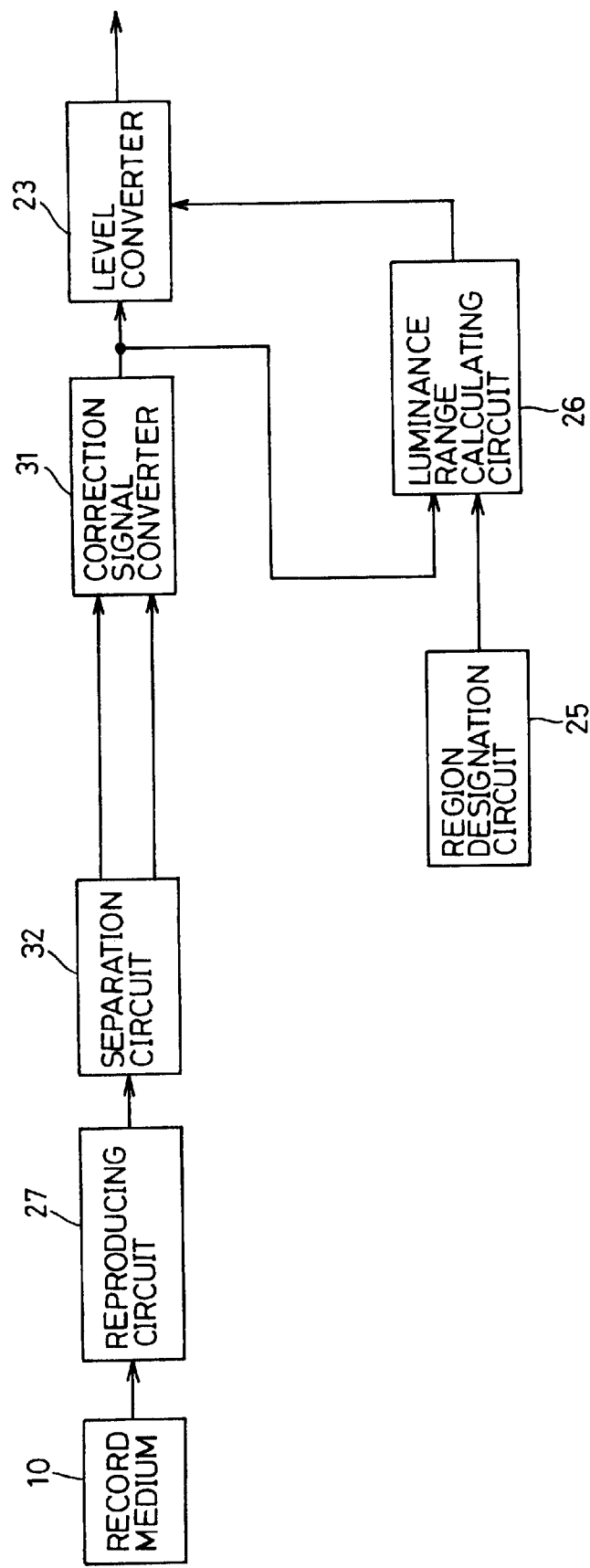
FIG. 26 is a block diagram of an image reproducing apparatus which is a thirteenth embodiment of the invention.

FIGS. 25 and 26 show the configuration of image reproducing apparatuses which are twelfth and thirteenth embodiments of the invention, respectively. In the embodiments, the operations conducted before and including the conversion in which a video signal of standard illuminance and a corrected video signal of high illuminance are converted in the correction signal converter 31 so as to attain a linear relationship between the object illuminance and the luminance are the same as those of the tenth and eleventh embodiments. The level converter 23 converts the luminance level to be output to the display apparatus or the printer so that the image of the region which is designated by the user through the region designation circuit 25 is provided with gradation, in the same manner as the seventh embodiment. Therefore, the description of these operations is omitted.

What is claimed is:

1. An image recording apparatus comprising:

a plurality of imaging means each having different signal charge accumulation periods in one field or one frame and generating respective plural image signals, the plural image signals are one of i) two kinds of image signals and ii) first and second image signals, the first image signal being longer in signal charge accumulation period than the second image signal, recording means for recording at least a portion of each of the plural image signals obtained in the signal accumulation periods, on a record medium, said recording means includes parameter recording means for recording a parameter which is used in the correction by said correcting means, on the record medium, and selecting means for selecting one of the plural image signals output from said plurality of imaging means, on the basis of a predetermined criterion, and said recording means records the selected image signal, said selecting means includes correcting means for, at least when the second image signal is to be selected, correcting the second image signal to be selected by using the second image signal and the threshold, and outputting the corrected second image signal, wherein in the selection of one of the image signals on the basis of the predetermined criterion, when a value of the first image signal is smaller than a predetermined threshold, the first image signal is selected, and, when the value of the first image signal is not smaller than the threshold, the second image signal is selected.

2. An image recording apparatus comprising:

a plurality of imaging means each having different signal charge accumulation periods in one field or one frame and generating respective plural image signals, the plural image signals are one of i) two kinds of image signals and ii) first and second image signals, the first image signal being longer in signal charge accumulation period than the second image signal, recording means for recording at least a portion of each of the plural image signals obtained in the signal accumulation periods, on a record medium, said recording means includes parameter multiplexing means for recording a parameter which is used in the correction by said correcting means, with being multiplexed with the second image signal, on the record medium, and selecting means for selecting one of the plural image signals output from said plurality of imaging means, on the basis of a predetermined criterion, and said recording means records the selected image signal, said selecting means includes correcting means for, at least when the second image signal is to be selected, correcting the second image signal to be selected by using the second image signal and the threshold, and outputting the corrected second image signal, wherein in the selection of one of the image signals on the basis of the predetermined criterion, when a value of the first image signal is smaller than a predetermined threshold, the first image signal is selected, and, when the value of the first image signal is not smaller than the threshold, the second image signal is selected.

3. An image recording and reproducing apparatus comprising:

a plurality of imaging means each having different signal charge accumulation periods in one field or one frame and generating respective plural image signals;

recording means for recording a whole of each of the plural image signals obtained in the signal accumulation periods on a record medium;

reading means for reading out the plural image signals which have different signal charge accumulation periods and which are recorded on the record medium;

selecting/outputting means for selecting one of the plural read out image signals, on the basis of a predetermined criterion, and outputting the selected image signal;

image displaying/outputting means for displaying or outputting an image with using the selected signal; and object illuminance range designating means for designating an object illuminance range which is to be reproduced by said displaying/outputting means, wherein the selected image signal is to be displayed or output by said image displaying/outputting means, at least in the designated object illuminance range.

4. An image recording and reproducing apparatus according to claim 3, wherein said apparatus further comprises luminance level changing means for, when a luminance level of the selected signal in the designated object illuminance range exceeds a maximum limit of said image displaying/outputting means, changing the luminance level of the selected signal in the object illuminance range so as to become lower than the maximum limit.

5. An image reproducing apparatus comprising:

reading means for reading out plural image signals which have different signal charge accumulation periods and which are recorded on a record medium by an image recording apparatus, said image recording apparatus including:

i) a plurality of imaging means each having different signal charge accumulation periods in one field or one frame and generating the plural image signals, ii) recording means for recording at least a portion of each of the plural image signals obtained in the signal accumulation periods on the record medium, iii) selecting means for selecting one of the plural image signals output from said plurality of imaging means, on the basis of a predetermined criterion, and said recording means records the selected image signal;

image displaying/outputting means for displaying or outputting an image by using the read out signal; and object illuminance range designating means for designating an object illuminance range which is to be reproduced by said displaying/outputting means, wherein the read out signal is to be displayed or output by said image displaying/outputting means, at least in the designated object illuminance range.

6. An image reproducing apparatus according to claim 5, wherein said apparatus further comprises luminance level changing means for, when a luminance level of the read out signal in the designated object illuminance range exceeds a maximum limit of said image displaying/outputting means, changing the luminance range so as to become lower than the maximum limit.

7. An image reproducing apparatus according to claim 5, wherein the plural image signals which have different signal charge accumulation periods are two kinds of image signals or first and second image signals, the first image signal being longer in signal charge accumulation period than the second image signal, and, in the selection of one of the image signals on the basis of the predetermined criterion in said image recording apparatus, when a value of the first image signal is smaller than a predetermined threshold, the first image signal is selected, and, when the value of the first image signal is not smaller than the threshold, the second image signal is selected.

8. An image reproducing apparatus according to claim 7, wherein said image recording apparatus comprises identification information adding means for adding an identification information to the selected image signal, the identification information indicating which one of the two kinds of image signals is selected by said selecting means as the one image signal.

9. An image reproducing apparatus according to claim 7, wherein said selecting means of said image recording apparatus comprises correcting means for, at least when the second image signal is to be selected, correcting the second image signal to be selected with using the second image signal and the threshold, and outputting the corrected second image signal.

10. An image reproducing apparatus according to claim 9, wherein said recording means of said image recording apparatus comprises parameter recording means for recording a parameter which is used in the correction by said correcting means, on the record medium.

11. An image reproducing apparatus according to claim 9, wherein said recording means of said image recording apparatus comprises parameter multiplexing means for recording a parameter which is used in the correction by said correcting means, with being multiplexed with the second image signal, on the record medium.

12. An image recording and reproducing apparatus comprising:

a plurality of imaging means each having different signal charge accumulation periods in one field or one frame and generating respective plural image signals;

recording means for recording a whole of each of the plural image signals obtained in the signal accumulation periods on a record medium;

reading means for reading out the plural image signals which have different signal charge accumulation periods and which are recorded on the record medium;

selecting/outputting means for selecting one of the plural read out image signals, on the basis of a predetermined criterion, and outputting the selected image signal;

image displaying/outputting means for displaying or outputting an image with using the selected signal;

region determining means for designating a predetermined region in an image region which can be subjected to the display or the output in said displaying/outputting means;

calculating means for calculating distribution of the number of pixels in the designated region with respect to a luminance; and object illuminance range determining means for, with using a result of the calculation, determining an object illuminance range which is to be reproduced by said displaying/outputting means, in the designated region, wherein a signal in the designated region is to be subjected to the display or the output by said image displaying/outputting means, in the determined object illuminance range.

13. An image reproducing apparatus according to claim 12, wherein said apparatus further comprises luminance level changing means for, when a luminance level of a signal in the designated region in the determined object illuminance range exceeds a maximum limit of said image displaying/outputting means, changing the luminance level of the signal in the designated range so as to become lower than the maximum limit.

14. An image reproducing apparatus comprising:

reading means for reading out plural image signals which have different signal charge accumulation periods and which are recorded on a record medium by an image recording apparatus, said image recording apparatus including:

i) a plurality of imaging means each having different signal charge accumulation periods in one field or one frame and generating the plural image signals, ii) recording means for recording at least a portion of each of the plural image signals obtained in the signal accumulation periods on the record medium, iii) selecting means for selecting one of the plural image signals output from said plurality of imaging means, on the basis of a predetermined criterion, and said recording means records the selected image signal;

image displaying/outputting means for displaying or outputting an image by using the read out signal;

region designating means for designating a predetermined region in an image region which can be subjected to the display or the output in said displaying/outputting means;

calculating means for calculating distribution of the number of pixels in the designated region with respect to a luminance; and object illuminance range designating means for, with using a result of the calculation, determining an object illuminance range which is to be reproduced by said displaying/outputting means, in the designated region wherein a signal in the designated region is to be subjected to the display or the output by said image displaying/outputting means, in the determined object illuminance range.

15. An image reproducing apparatus according to claim 14, wherein said apparatus further comprises luminance level changing means for, when a luminance level of a signal in the designated region in the determined object illuminance range exceeds a maximum limit of said image displaying/outputting means, changing the luminance level of the signal in the designated range so as to become lower than the maximum limit.

16. An image reproducing apparatus according to claim 14, wherein the plural image signals which have different signal charge accumulation periods are two kinds of image signals or first and second image signals, the first image signal being longer in signal charge accumulation period than the second image signal, and, in the selection of one of the image signals on the basis of the predetermined criterion in said image recording apparatus, when a value of the first image signal is smaller than a predetermined threshold, the first image signal is selected, and, when the value of the first image signal is not smaller than the threshold, the second image signal is selected.

17. An image reproducing apparatus according to claim 16, wherein said image recording apparatus comprises identification information adding means for adding an identification information to the selected image signal, the identification information indicating which one of the two kinds of image signals is selected by said selecting means as the one image signal.

18. An image reproducing apparatus according to claim 16, wherein said selecting means of said image recording apparatus comprises correcting means for, at least when the second image signal is to be selected, correcting the second image signal to be selected with using the second image signal and the threshold, and outputting the corrected second image signal.

19. An image reproducing apparatus according to claim 18, wherein said recording means of said image recording apparatus comprises a parameter recording means for recording a parameter which is used in the correction by said correcting means, on the record medium.

20. An image reproducing apparatus according to claim 18, wherein said recording means of said image recording apparatus comprises parameter multiplexing means for recording a parameter which is used in the correction by said correcting means, with being multiplexed with the second image signal, on the record medium.

21. An image recording apparatus comprising:

a plurality of imaging means which have different signal charge accumulation periods in one field or one frame;

recording means for recording a whole of plural image signals obtained in the signal accumulation periods, on a predetermined record medium;

reading means for reading out plural image signals which have different signal charge accumulation periods and which are recorded on the record medium by said recording means;

selecting/outputting means for selecting one of the plural read out image signals, on the basis of a predetermined criterion, and outputting the selected image signal;

image displaying/outputting means for displaying or outputting an image with using the selected signal; and object illuminance range designating means for designating an object illuminance range which is to be reproduced by said displaying/outputting means, wherein the selected image signal is to be displayed or output by said image displaying/outputting means, at least in the designated object illuminance range.

22. An image recording apparatus comprising:

a plurality of imaging means which have different signal charge accumulation periods in one field or one frame;

selecting means for selecting one of the plural image signals output from said imaging means, on the basis of a predetermined criterion;

recording means for recording the selected one of the plural image signals obtained in the signal accumulation periods, on a predetermined record medium;

reading means for reading out plural image signals which have difference signal charge accumulation periods and which are recorded on the record medium by said recording means;

image displaying/outputting means for displaying or outputting an image with using the read out signal; and object illuminance range designating means for designating an object illuminance range which is to be reproduced by said displaying/outputting means, wherein the read out signal is to be displayed or output by said image displaying/outputting means, at least in the designated object illuminance range.

23. An image recording apparatus comprising:

a plurality of imaging means which have different signal charge accumulation periods in one field or one frame;

recording means for recording a whole of plural image signals obtained in the signal accumulation periods, on a predetermined record medium;

reading means for reading out plural image signals which have different signal charge accumulation periods and which are recorded on the record medium by said recording means;

selecting/outputting means for selecting one of the plural read out image signals, on the basis of a predetermined criterion, and outputting the selected image signal;

image displaying/outputting means for displaying or outputting an image with using the selected signal;

region designating means for designating a predetermined region in an image region which can be subjected to the display or the output in said displaying/outputting means;

calculating means for calculating distribution of the number of pixels in the designated region with respect to a luminance; and object illuminance range determining means for, with using a result of the calculation, determining an object illuminance range which is to be reproduced by said displaying/outputting means, in the designated region, wherein a signal in the designated region is to be subjected to the display or the output by said image displaying/outputting means, in the determined object illuminance range.

24. An image recording apparatus comprising:

a plurality of imaging means which have different signal charge accumulation periods in one field or one frame and generating plural image signals;

selecting means for selecting one of the plural image signals output from said imaging means, on the basis of a predetermined criterion;

recording means for recording the selected one of the plural image signals obtained in the signal accumulation periods, on a predetermined record medium;

reading means for reading out plural image signals which have different signal charge accumulation periods and which are recorded on the record medium by said recording means;

image displaying/outputting means for displaying or outputting an image by using the read out signal;

region designating means for designating a predetermined region in an image region which can be subjected to the display or the output in said displaying/outputting means;

calculation means for calculating distribution of the number of pixels in the designated region with respect to a illuminance; and object illuminance range determining means for, by using a result of the calculation, determining an object illuminance range which is to be reproduced by said displaying/outputting means, in the designated region, wherein a signal in the designated region is to be subjected to the display or the output by said image displaying/outputting means, in the determined object illuminance range.

25. An image recording apparatus for recording an image signal comprising:

imaging means of outputting a plurality of image signals having different signal charge accumulation periods, correcting means of correcting said plurality of image signals output from said imaging means and outputting corrected image signals, image signal recording means of recording the corrected output image signals from said correcting means on a recording medium, and parameter recording means of recording a parameter which is used in the correction by said correcting means on said recording medium.

26. An image reproducing apparatus comprising:

image reproducing means of reproducing a plurality of image signals having different signal charge accumulation periods which have been recorded on a recording medium, correcting means of correcting a whole or a part of a luminance on the basis of said a plurality of reproduced image signals so that they may be represented by a continuous relationship with respect to a luminance level, and object illuminance range designating means of designating an object illuminance range so that the corrected image signals output from said correcting means may be displayed or output by a display or outputting means.

27. An image reproducing apparatus according to claim 26, wherein said image reproducing apparatus comprises luminance changing means of changing the luminance level of the corrected image signals in the designated object illuminance range into a level capable of being displayed or output by said displaying or outputting means.

28. An image reproducing apparatus comprising:

image reproducing means of reproducing a plurality of image signals having different signal charge accumulation periods which have been recorded on a recording medium, correcting means of correcting a whole or a part of a luminance on the basis of said a plurality of reproduced image signals so that they may be represented by a continuous relationship with respect to a luminance level, region designating means of designating a region in an image region of the corrected image signal output from said correcting means, and object illuminance range determining means of determining an object illuminance range which is to be displayed or output by a display or outputting means, in the designated region.

29. An image reproducing apparatus according to claim 28, wherein said image reproducing apparatus comprises luminance level changing means of changing the luminance level of the corrected image signals in the determined object illuminance range and in the designated region into a level capable of being displayed or output by said display or outputting means.

* * * * *

UNITED STATES PATENT AND TRADEMARK OFFICE
CERTIFICATE OF CORRECTION

PATENT NO.    : 6,710,802 B2
DATED         : March 23, 2004
INVENTOR(S)   : Hiroshi Akahori et al.

It is certified that error appears in the above-identified patent and that said Letters Patent is hereby corrected as shown below:

<u>Title page,</u>
Item [75], Inventors, after "Hiroshi Akahori", delete "Hirakata" and substitute therefore -- Osaka --; and after "Akira Fukumoto", delete "Hirakata" and substitute therefore -- Osaka --

Signed and Sealed this

Second Day of November, 2004

JON W. DUDAS
*Director of the United States Patent and Trademark Office*